United States Patent
Rico Alvarino et al.

(10) Patent No.: US 10,893,520 B2
(45) Date of Patent: Jan. 12, 2021

(54) DOWNLINK AND SYNCHRONIZATION TECHNIQUES FOR NARROWBAND WIRELESS COMMUNICATIONS

(71) Applicant: QUALCOMM Incorporated, San Diego, CA (US)

(72) Inventors: Alberto Rico Alvarino, San Diego, CA (US); Wanshi Chen, San Diego, CA (US); Seyed Ali Akbar Fakoorian, San Diego, CA (US); Peter Gaal, San Diego, CA (US); Shimman Arvind Patel, San Diego, CA (US); Madhavan Srinivasan Vajapeyam, San Diego, CA (US); Renqiu Wang, San Diego, CA (US); Jing Lei, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 15/244,653

(22) Filed: Aug. 23, 2016

(65) Prior Publication Data

US 2017/0064685 A1    Mar. 2, 2017

Related U.S. Application Data

(60) Provisional application No. 62/210,343, filed on Aug. 26, 2015, provisional application No. 62/277,462, filed on Jan. 11, 2016.

(51) Int. Cl.
*H04W 72/04* (2009.01)
*H04W 72/00* (2009.01)
(Continued)

(52) U.S. Cl.
CPC ........ *H04W 72/044* (2013.01); *H04B 7/0456* (2013.01); *H04L 5/005* (2013.01);
(Continued)

(58) Field of Classification Search
CPC .............. H04W 72/005; H04W 72/044; H04L 5/0091; H04L 5/005; H04L 5/0051; H04L 5/0048; H04L 5/0005
See application file for complete search history.

(56) References Cited

U.S. PATENT DOCUMENTS

| | | | |
|---|---|---|---|
| 2011/0216810 A1* | 9/2011 | Kumar | H04B 1/0483 375/146 |
| 2012/0002631 A1 | 1/2012 | Nishio et al. | |

(Continued)

FOREIGN PATENT DOCUMENTS

| | | |
|---|---|---|
| CN | 102273160 A | 12/2011 |
| CN | 104125187 A | 10/2014 |

(Continued)

OTHER PUBLICATIONS

Apple Inc, "On the Configuration and Usage of New Carrier Types," 3GPP TSG RAN WG1 Meeting #68, R1-120271, Dresden, Germany, Feb. 6-10, 2012, 6 pgs., XP050563181, 3rd Generation Partnership Project.

(Continued)

*Primary Examiner* — Feben Haile
(74) *Attorney, Agent, or Firm* — Dalei Dong; Holland & Hart LLP

(57) ABSTRACT

Various techniques for narrowband communications in a wireless communications network are provided. Narrowband communications may be transmitted using a single resource block (RB) of a number of RBs used for wideband communications. In order to provide for efficient device discovery and synchronization using narrowband communications, a synchronization signal, such as a primary synchronization signal (PSS) or secondary synchronization signal (SSS), may be transmitted within the single resource block. The synchronization signal may be transmitted, for example, using multiple orthogonal frequency division mul- (Continued)

tiplexing (OFDM) symbols within the single RB. A common reference signal (CRS) may also be present in the single resource block, which may puncture the synchronization signal, in some examples. In other examples, the synchronization signal may be mapped to non-CRS symbols of the single resource block.

17 Claims, 29 Drawing Sheets

(51) Int. Cl.
  *H04L 5/00* (2006.01)
  *H04B 7/0456* (2017.01)
(52) U.S. Cl.
  CPC ......... *H04L 5/0091* (2013.01); *H04W 72/005* (2013.01); *H04L 5/0005* (2013.01); *H04L 5/0048* (2013.01); *H04L 5/0051* (2013.01)

(56) References Cited

U.S. PATENT DOCUMENTS

| | | | |
|---|---|---|---|
| 2013/0195043 A1 | 8/2013 | Chen et al. | |
| 2013/0272215 A1* | 10/2013 | Khoryaev | H04W 28/02 370/329 |
| 2013/0301524 A1 | 11/2013 | Xu et al. | |
| 2016/0302092 A1* | 10/2016 | Sartori | H04L 5/0094 |
| 2016/0323901 A1* | 11/2016 | Yum | H04W 72/085 |
| 2018/0227897 A1* | 8/2018 | Yeo | H04W 84/04 |
| 2019/0028245 A1* | 1/2019 | Gao | H04W 72/0453 |
| 2019/0229867 A1* | 7/2019 | Yi | H04L 5/0048 |

FOREIGN PATENT DOCUMENTS

| | | |
|---|---|---|
| RU | 2502230 C2 | 12/2013 |
| WO | WO-2013173673 A2 | 11/2013 |
| WO | WO-2017033841 A1 | 3/2017 |

OTHER PUBLICATIONS

Ericsson LM et al., "Narrowband LTE—Concept Description," 3GPP TSG RAN WG1 Meeting #82, R1-154659, Beijing, China, Aug. 24-28, 2015, 9 pgs., XP051001893, 3rd Generation Partnership Project.

ISA/EP, International Search Report and Written Opinion of the International Searching Authority, Int'l Application No. PCT/US2016/048406, dated Feb. 24, 2017, European Patent Office, Rijswijk, NL, 26 pgs.

LG Electronics, "Downlink Control Channel Related Issues for MTC," 3GPP TSG RAN WG1 Meeting #80, R1-150199, Athens, Greece, Feb. 9-13, 2015, 9 pgs., XP050933413, 3rd Generation Partnership Project.

Mediatek Inc, "New Work Item on Narrow Band and Power Efficient LTE for MTC," 3GPP TSG RAN Meeting #65, RP-141408, Edinburgh, Great Britain, Sep. 9-12, 2014, 7 pgs., XP050783741, 3rd Generation Partnership Project.

Panasonic, "MTC Narrowband Definition and Collision Handling," 3GPP TSG RAN WG1 Meeting #82, R1-153960. Beijing, China, Aug. 24-28, 2015, 6 pgs., XP051039358, 3rd Generation Partnership Project.

Ericsson, "Resource Allocation for Low Cost MTC UE," 3GPP TSG RAN WG1 Meeting #76bis, R1-141633, Shenzhen, P.R. China, Mar. 31-Apr. 4, 2014, 3 pgs., XP050787300, 3rd Generation Partnership Project.

Mediatek Inc., "Necessity of Higher Layer Signaling for CRS IC," 3GPP TSG-RAN WG1 Meeting #68bis, R1-121167, Jeju, Korea, Mar. 26-30, 2012, 3 pgs., XP050599470, 3rd Generation Partnership Project.

ISA/EPO, Partial International Search Report of the International Searching Authority, Int'l App. No. PCT/US2016/048406, dated Nov. 11, 2016, European Patent Office, Rijswijk, NL, 9 pgs.

ZTE, "Further Considerations on Physical Broadcast Channel for MTC Enhancement," 3GPP TSG RAN WG1 Meeting #80, R1-150147, Athens, Greece, Feb. 9-13, 2015, 7 pgs., XP050933361, 3rd Generation Partnership Project.

Taiwan Search Report—TW105127166—TIPO—dated Feb. 29, 2020 (156865TW).

LG Electronics: "Further Details on Narrowbands and Frequency Hopping", R1-154227, 3GPP TSG RAN WG1 Meeting #82, Beijing, China, Aug. 24-28, 2015, Aug. 14, 2015, 8 pages, URL: http://www.3gpp.org/ftp/tsg_ran/WG1_RL1/TSGR1_82/Docs/R1-154227.zip.

* cited by examiner

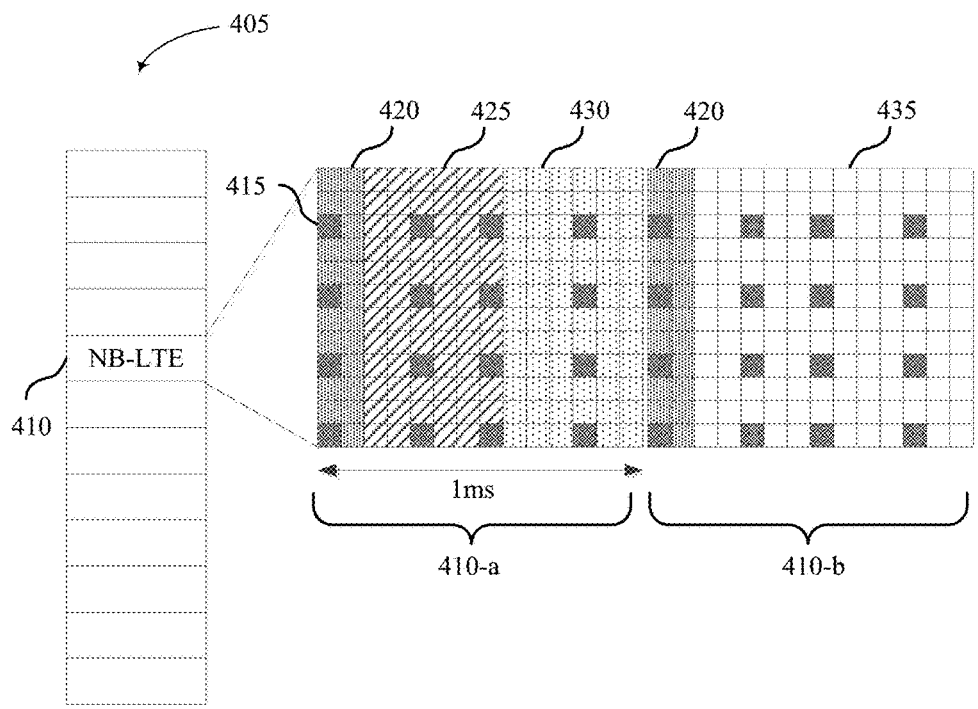
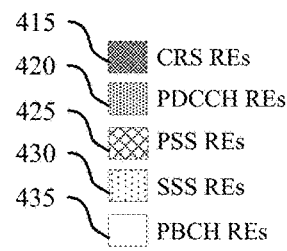
FIG. 4

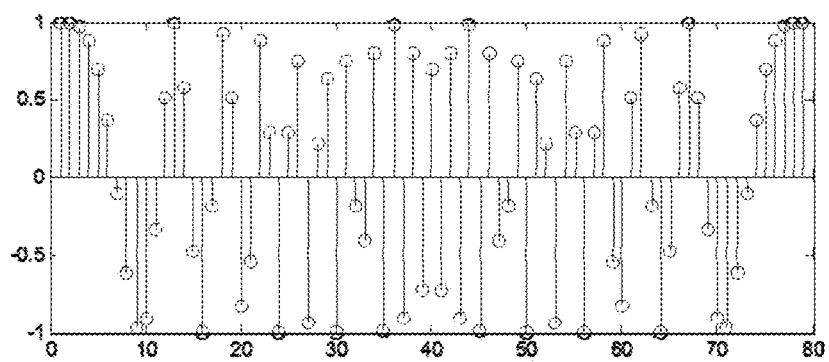
FIG. 8A — 800
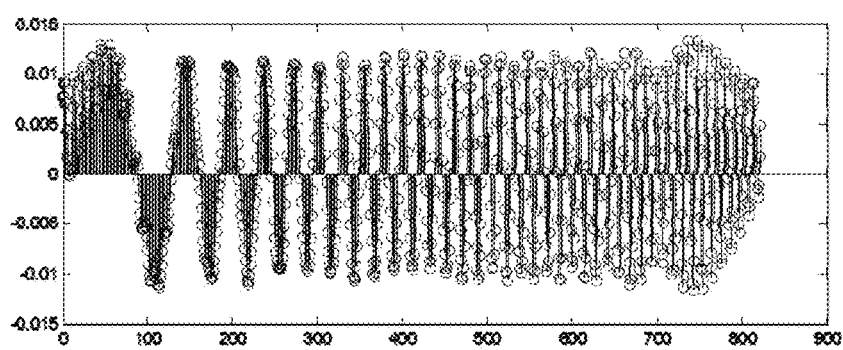
FIG. 8B — 820
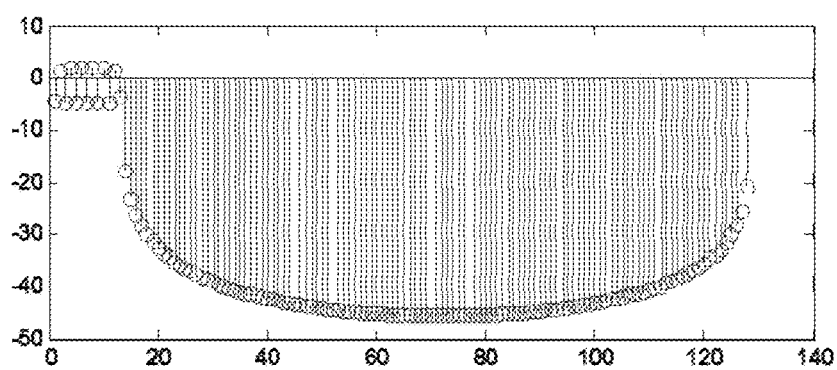
FIG. 8C — 840

DOWNLINK AND SYNCHRONIZATION TECHNIQUES FOR NARROWBAND WIRELESS COMMUNICATIONS

CROSS REFERENCES

The present application for patent claims priority to U.S. Provisional Patent Application No. 62/210,343 by Rico Alvarino et al., entitled "Downlink and Synchronization Techniques for Narrowband Wireless Communications," filed Aug. 26, 2015; and U.S. Provisional Patent Application No. 62/277,462 by Rico Alvarino et al., entitled "Downlink and Synchronization Techniques for Narrowband Wireless Communications," filed Jan. 11, 2016; each of which is assigned to the assignee hereof.

BACKGROUND

The following relates generally to wireless communication, and more specifically to downlink and synchronization techniques for narrowband wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communications systems may provide for narrowband communication between wireless devices, such as those implementing Machine-to-Machine (M2M) communication or Machine Type Communication (MTC). In some examples, MTC devices may have reduced complexity or reduced performance metrics and may be associated with narrowband communication, low cost operation, low power consumption, or the like. Signal processing using sampling rates appropriate for non-MTC devices may result in high processing complexity and power consumption relative to the capabilities of an MTC device.

SUMMARY

The described features generally relate to one or more improved systems, methods, and/or apparatuses for narrowband communication in a wireless communications system. In some aspects, a synchronization signal, such as a primary synchronization signal (PSS) or secondary synchronization signal (SSS) may be transmitted within a single resource block in a narrowband transmission. A common reference signal (CRS) (also referred to as a cell-specific reference signal) may also be present in the single resource block, which may puncture the synchronization signal, in some examples. In other examples, the synchronization signal may be mapped to non-CRS symbols of the single resource block.

In certain aspects of the disclosure, a base station may transmit, and a UE may receive, an indication of a location of a single resource block for narrowband transmissions within a wideband region of the system bandwidth. The UE may identify one or more synchronization parameters for receiving the narrowband transmissions based on the indication. The UE may, in some examples, select a decoding technique for decoding based on the identified frequency band of the narrowband transmissions, such as based on whether the identified frequency band is within a wideband transmission bandwidth or outside of the wideband transmission bandwidth. In other aspects, a set of subcarriers may be identified within the narrowband region of the system bandwidth used to transmit a resource block, and a center-frequency subcarrier of the set of subcarriers identified. One or more other subcarriers of the set of subcarriers may be modified based on the identification of the center-frequency subcarrier, such as through frequency shifting or power boosting, for example.

A method of wireless communication is described. The method may include receiving a synchronization signal for device discovery, the synchronization signal comprising two or more OFDM symbols within a single resource block transmitted in the narrowband region, and synchronizing one or more parameters of transmissions in the narrowband region based at least in part on the synchronization signal.

An apparatus for wireless communication is described. The apparatus may include means for receiving a synchronization signal for device discovery, the synchronization signal comprising two or more OFDM symbols within a single resource block transmitted in the narrowband region, and means for synchronizing one or more parameters of transmissions in the narrowband region based at least in part on the synchronization signal.

A further apparatus for wireless communication is described. The apparatus may include a processor, memory in electronic communication with the processor, and instructions stored in the memory and operable, when executed by the processor, to cause the apparatus to receive a synchronization signal for device discovery, the synchronization signal comprising two or more OFDM symbols within a single resource block transmitted in the narrowband region, and synchronize one or more parameters of transmissions in the narrowband region based at least in part on the synchronization signal.

A non-transitory computer-readable medium storing code for wireless communication is described. The code may include instructions executable to receive a synchronization signal for device discovery, the synchronization signal comprising two or more OFDM symbols within a single resource block transmitted in the narrowband region, and synchronize one or more parameters of transmissions in the narrowband region based at least in part on the synchronization signal.

Some examples of the method, apparatuses, or non-transitory computer-readable medium described herein may further include processes, features, means, or instructions for determining whether the narrowband region is within a bandwidth of one or more wideband transmissions based at least in part of a format of the synchronization signal. Additionally or alternatively, in some examples the determining comprises identifying that the narrowband region is within the bandwidth of one or more wideband transmissions in response to the synchronization signal being formatted in consecutive OFDM symbols within the single resource block, and identifying that the narrowband region is outside of the bandwidth of one or more wideband transmissions in response to the synchronization signal being formatted in one or more non-consecutive OFDM symbols within the single resource block.

In some examples of the method, apparatuses, or non-transitory computer-readable medium described herein, the synchronization signal comprises one or more of a PSS or an SSS. Additionally or alternatively, in some examples the generating the synchronization signal comprises generating a sequence in a frequency domain or a time domain based at least in part on a number of OFDM symbols in the single resource block, and generating an interpolated time domain version of the first sequence based at least in part on a set of samples of the first sequence.

In some examples of the method, apparatuses, or non-transitory computer-readable medium described herein, the generating the synchronization signal further comprises splitting the interpolated time domain version into a plurality of parts each having a duration of one OFDM symbol, identifying a subset of samples for each part that correspond to a cyclic prefix associated with the associated OFDM symbol, removing the identified subset of samples for each part, and inserting a cyclic prefix into each part. Additionally or alternatively, in some examples generating the synchronization signal further comprises windowing each OFDM symbol in the frequency domain such that only a subset of OFDM subcarriers carry the synchronization sequence.

A method of wireless communication is described. The method may include receiving an indication of a location of a single resource block for narrowband transmissions, the single resource block within the wideband region of the system bandwidth, and identifying one or more synchronization parameters for receiving the narrowband transmissions based at least in part on the indication.

An apparatus for wireless communication is described. The apparatus may include means for receiving an indication of a location of a single resource block for narrowband transmissions, the single resource block within the wideband region of the system bandwidth, and means for identifying one or more synchronization parameters for receiving the narrowband transmissions based at least in part on the indication.

A further apparatus for wireless communication is described. The apparatus may include a processor, memory in electronic communication with the processor, and instructions stored in the memory and operable, when executed by the processor, to cause the apparatus to receive an indication of a location of a single resource block for narrowband transmissions, the single resource block within the wideband region of the system bandwidth, and identify one or more synchronization parameters for receiving the narrowband transmissions based at least in part on the indication.

A non-transitory computer-readable medium storing code for wireless communication is described. The code may include instructions executable to receive an indication of a location of a single resource block for narrowband transmissions, the single resource block within the wideband region of the system bandwidth, and identify one or more synchronization parameters for receiving the narrowband transmissions based at least in part on the indication.

In some examples of the method, apparatuses, or non-transitory computer-readable medium described herein, the identifying the one or more synchronization parameters comprises generating a CRS sequence based at least in part on the a cell identification of a transmitter and a resource block offset value included in the indication. Additionally or alternatively, in some examples the indication comprises a total wideband bandwidth of the system bandwidth and a resource block index that indicates a location of the single resource block.

In some examples of the method, apparatuses, or non-transitory computer-readable medium described herein, the indication is transmitted in one or more of a master information block (MIB) or a system information block (SIB).

A method of wireless communication is described. The method may include identifying a frequency band of the narrowband region of the system bandwidth for transmission of a physical broadcast channel (PBCH) that includes system information for device discovery, and selecting a decoding technique for decoding the PBCH based at least in part on the identified frequency band of the narrowband region.

An apparatus for wireless communication is described. The apparatus may include means for identifying a frequency band of the narrowband region of the system bandwidth for transmission of a PBCH that includes system information for device discovery, and means for selecting a decoding technique for decoding the PBCH based at least in part on the identified frequency band of the narrowband region.

A further apparatus for wireless communication is described. The apparatus may include a processor, memory in electronic communication with the processor, and instructions stored in the memory and operable, when executed by the processor, to cause the apparatus to identify a frequency band of the narrowband region of the system bandwidth for transmission of a PBCH that includes system information for device discovery, and select a decoding technique for decoding the PBCH based at least in part on the identified frequency band of the narrowband region.

A non-transitory computer-readable medium storing code for wireless communication is described. The code may include instructions executable to identify a frequency band of the narrowband region of the system bandwidth for transmission of a PBCH that includes system information for device discovery, and select a decoding technique for decoding the PBCH based at least in part on the identified frequency band of the narrowband region.

Some examples of the method, apparatuses, or non-transitory computer-readable medium described herein may further include processes, features, means, or instructions for determining, based at least in part on the identified frequency band, whether the narrowband region is within a bandwidth of one or more wideband transmissions. Additionally or alternatively, in some examples the determining whether the narrowband region is within the bandwidth of one or more wideband transmissions is based at least in part on a radio access technology associated with the identified frequency band.

In some examples of the method, apparatuses, or non-transitory computer-readable medium described herein, the determining whether the narrowband region is within the bandwidth of one or more wideband transmissions comprises determining that the narrowband region is outside of the bandwidth of one or more wideband transmissions in response to the identified frequency band being located in radio spectrum allocated to Global System for Mobile communications (GSM) communications, and determining that the narrowband region is within the bandwidth of one or more wideband transmissions in response to the identified frequency band being located in radio spectrum allocated to LTE communications. Additionally or alternatively, in some examples selecting the decoding technique for decoding the PBCH comprises selecting a CRS based decoding technique in response to determining that the narrowband region is outside of the bandwidth of one or more wideband transmissions, and selecting a demodulation reference signal (DMRS) based decoding technique in response to determining that the narrowband region is within the bandwidth of one or more wideband transmissions.

A method of wireless communication is described. The method may include identifying a plurality of subcarriers within the narrowband region of the system bandwidth used to transmit a resource block, identifying a center-frequency subcarrier of the plurality of subcarriers used to transmit the resource block, and modifying one or more other subcarriers of the plurality of subcarriers based at least in part on the identification of the center-frequency subcarrier.

An apparatus for wireless communication is described. The apparatus may include means for identifying a plurality of subcarriers within the narrowband region of the system bandwidth used to transmit a resource block, means for identifying a center-frequency subcarrier of the plurality of subcarriers used to transmit the resource block, and means for modifying one or more other subcarriers of the plurality of subcarriers based at least in part on the identification of the center-frequency subcarrier.

A further apparatus for wireless communication is described. The apparatus may include a processor, memory in electronic communication with the processor, and instructions stored in the memory and operable, when executed by the processor, to cause the apparatus to identify a plurality of subcarriers within the narrowband region of the system bandwidth used to transmit a resource block, identify a center-frequency subcarrier of the plurality of subcarriers used to transmit the resource block, and modify one or more other subcarriers of the plurality of subcarriers based at least in part on the identification of the center-frequency subcarrier.

A non-transitory computer-readable medium storing code for wireless communication is described. The code may include instructions executable to identify a plurality of subcarriers within the narrowband region of the system bandwidth used to transmit a resource block, identify a center-frequency subcarrier of the plurality of subcarriers used to transmit the resource block, and modify one or more other subcarriers of the plurality of subcarriers based at least in part on the identification of the center-frequency subcarrier.

In some examples of the method, apparatuses, or non-transitory computer-readable medium described herein, the modifying one or more other subcarriers comprises receiving an indication that the center-frequency subcarrier is to be unused for data transmissions, and rating matching data transmissions around the center-frequency subcarrier. Additionally or alternatively, in some examples the modifying one or more other subcarriers further comprises power boosting one or more of the plurality of subcarriers other than the center-frequency subcarrier.

In some examples of the method, apparatuses, or non-transitory computer-readable medium described herein, the modifying one or more other subcarriers comprises applying a frequency shift to one or more of the plurality of subcarriers other than the center-frequency subcarrier. Additionally or alternatively, in some examples the modifying one or more other subcarriers comprises generating a digital waveform with an offset corresponding to a frequency shift of one-half of a subcarrier frequency bandwidth, and adjusting a transmit oscillator based at least in part on the offset of the digital waveform.

A method of wireless communication is described. The method may include generating a synchronization signal for device discovery, the synchronization signal comprising two or more OFDM symbols within a single resource block, and transmitting the synchronization signal in the narrowband region.

An apparatus for wireless communication is described. The apparatus may include means for generating a synchronization signal for device discovery, the synchronization signal comprising two or more OFDM symbols within a single resource block, and means for transmitting the synchronization signal in the narrowband region.

A further apparatus for wireless communication is described. The apparatus may include a processor, memory in electronic communication with the processor, and instructions stored in the memory and operable, when executed by the processor, to cause the apparatus to generate a synchronization signal for device discovery, the synchronization signal comprising two or more OFDM symbols within a single resource block, and transmit the synchronization signal in the narrowband region.

A non-transitory computer-readable medium storing code for wireless communication is described. The code may include instructions executable to generate a synchronization signal for device discovery, the synchronization signal comprising two or more OFDM symbols within a single resource block, and transmit the synchronization signal in the narrowband region.

In some examples of the method, apparatuses, or non-transitory computer-readable medium described herein, the synchronization signal comprises one or more of a PSS or a SSS. Additionally or alternatively, in some examples the synchronization signal is transmitted in a set of contiguous OFDM symbols.

Some examples of the method, apparatuses, or non-transitory computer-readable medium described herein may further include processes, features, means, or instructions for transmitting a CRS using one or more resource elements (REs) that puncture the set of contiguous OFDM symbols. Additionally or alternatively, some examples may include processes, features, means, or instructions for identifying one or more OFDM symbols within the single resource block as CRS OFDM symbols that include one or more CRS REs, and mapping the OFDM symbols that contain the synchronization signal to non-CRS OFDM symbols.

In some examples of the method, apparatuses, or non-transitory computer-readable medium described herein, the transmission of the synchronization signal in the narrowband region comprises transmitting the synchronization signal in a subframe previously configured as a MBMS single frequency network (MBSFN) subframe. Additionally or alternatively, some examples may include processes, features, means, or instructions for configuring a subframe that includes the synchronization signal as an MBSFN subframe.

Some examples of the method, apparatuses, or non-transitory computer-readable medium described herein may further include processes, features, means, or instructions for identifying whether the narrowband region is within a bandwidth of one or more wideband transmissions, and indicating to one or more receivers whether the narrowband region is within the bandwidth of one or more wideband transmissions. Additionally or alternatively, in some examples the indicating to one or more receivers whether the narrowband region is within the bandwidth of one or more wideband transmissions comprises selecting OFDM symbols within the single resource block for transmission of the based at least in part on whether the narrowband region is within the bandwidth of one or more wideband transmissions, and transmitting the synchronization signal using the selected OFDM symbols.

A method of wireless communication is described. The method may include identifying a location of the narrowband region of the system bandwidth as a single resource block within a wideband region of the system bandwidth, and transmitting an indication of the location of the single resource block within the wideband region of the system bandwidth.

An apparatus for wireless communication is described. The apparatus may include means for identifying a location of the narrowband region of the system bandwidth as a single resource block within a wideband region of the system bandwidth, and means for transmitting an indication of the location of the single resource block within the wideband region of the system bandwidth.

A further apparatus for wireless communication is described. The apparatus may include a processor, memory in electronic communication with the processor, and instructions stored in the memory and operable, when executed by the processor, to cause the apparatus to identify a location of the narrowband region of the system bandwidth as a single resource block within a wideband region of the system bandwidth, and transmit an indication of the location of the single resource block within the wideband region of the system bandwidth.

A non-transitory computer-readable medium storing code for wireless communication is described. The code may include instructions executable to identify a location of the narrowband region of the system bandwidth as a single resource block within a wideband region of the system bandwidth, and transmit an indication of the location of the single resource block within the wideband region of the system bandwidth.

In some examples of the method, apparatuses, or non-transitory computer-readable medium described herein, the indication comprises a total wideband bandwidth of the system bandwidth and a resource block index that indicates a location of the single resource block. Additionally or alternatively, in some examples the indication comprises a resource block offset from start of a wideband bandwidth of the system bandwidth. In further examples, the resource block offset is offset with respect to the center of the bandwidth.

In some examples of the method, apparatuses, or non-transitory computer-readable medium described herein, the indication comprises one or more CRS resource elements included in the single resource block. Additionally or alternatively, in some examples the indication is transmitted in one or more of a MIB or a SIB.

A method of wireless communication is described. The method may include generating a PBCH signal for transmission of system information for device discovery in the narrowband region, modulating the PBCH signal based at least in part on a DMRS, and transmitting the modulated PBCH signal in the narrowband region.

An apparatus for wireless communication is described. The apparatus may include means for generating a PBCH signal for transmission of system information for device discovery in the narrowband region, means for modulating the PBCH signal based at least in part on a DMRS, and means for transmitting the modulated PBCH signal in the narrowband region.

A further apparatus for wireless communication is described. The apparatus may include a processor, memory in electronic communication with the processor, and instructions stored in the memory and operable, when executed by the processor, to cause the apparatus to generate a PBCH signal for transmission of system information for device discovery in the narrowband region, modulate the PBCH signal based at least in part on a DMRS, and transmit the modulated PBCH signal in the narrowband region.

A non-transitory computer-readable medium storing code for wireless communication is described. The code may include instructions executable to generate a PBCH signal for transmission of system information for device discovery in the narrowband region, modulate the PBCH signal based at least in part on a DMRS, and transmit the modulated PBCH signal in the narrowband region.

In some examples of the method, apparatuses, or non-transitory computer-readable medium described herein, the modulating the PBCH signal comprises selecting a precoding matrix for transmission of the modulated PBCH signal, and using the selected precoding matrix for other transmissions in the narrowband region on the system bandwidth. Additionally or alternatively, some examples may include processes, features, means, or instructions for transmitting a CRS in one or more of the modulated PBCH signal or the other transmissions in the narrowband region of the system bandwidth, the CRS for use in channel estimation be one or more receivers.

A method of wireless communication is described. The method may include generating a PBCH signal for transmission of system information for device discovery, the PBCH signal included in a resource block to be transmitted in the narrowband region, identifying a subframe that includes the resource block as a MBSFN subframe, and transmitting the PBCH signal in the MBSFN subframe.

An apparatus for wireless communication is described. The apparatus may include means for generating a PBCH signal for transmission of system information for device discovery, the PBCH signal included in a resource block to be transmitted in the narrowband region, means for identifying a subframe that includes the resource block as a MBSFN subframe, and means for transmitting the PBCH signal in the MBSFN subframe.

A further apparatus for wireless communication is described. The apparatus may include a processor, memory in electronic communication with the processor, and instructions stored in the memory and operable, when executed by the processor, to cause the apparatus to generate a PBCH signal for transmission of system information for device discovery, the PBCH signal included in a resource block to be transmitted in the narrowband region, identify a subframe that includes the resource block as a MBSFN subframe, and transmit the PBCH signal in the MBSFN subframe.

A non-transitory computer-readable medium storing code for wireless communication is described. The code may include instructions executable to generate a PBCH signal for transmission of system information for device discovery, the PBCH signal included in a resource block to be transmitted in the narrowband region, identify a subframe that includes the resource block as a MBSFN subframe, and transmit the PBCH signal in the MBSFN subframe.

Some examples of the method, apparatuses, or non-transitory computer-readable medium described herein may further include processes, features, means, or instructions for transmitting a CRS in the resource block. Additionally or alternatively, in some examples the CRS is generated assuming a resource block offset of zero.

In some examples of the method, apparatuses, or non-transitory computer-readable medium described herein, the CRS is transmitted in one or more OFDM symbols within the resource block, and wherein the one or more OFDM symbols have a fixed offset within the resource block.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates an example of a resource element mapping that supports downlink and synchronization techniques for narrowband wireless communications, in accordance with various aspects of the present disclosure;

FIGS. 8A-8C illustrate examples of a sequence generation that supports downlink and synchronization techniques for narrowband wireless communications in accordance with various aspects of the present disclosure;

DETAILED DESCRIPTION

Figure 1:
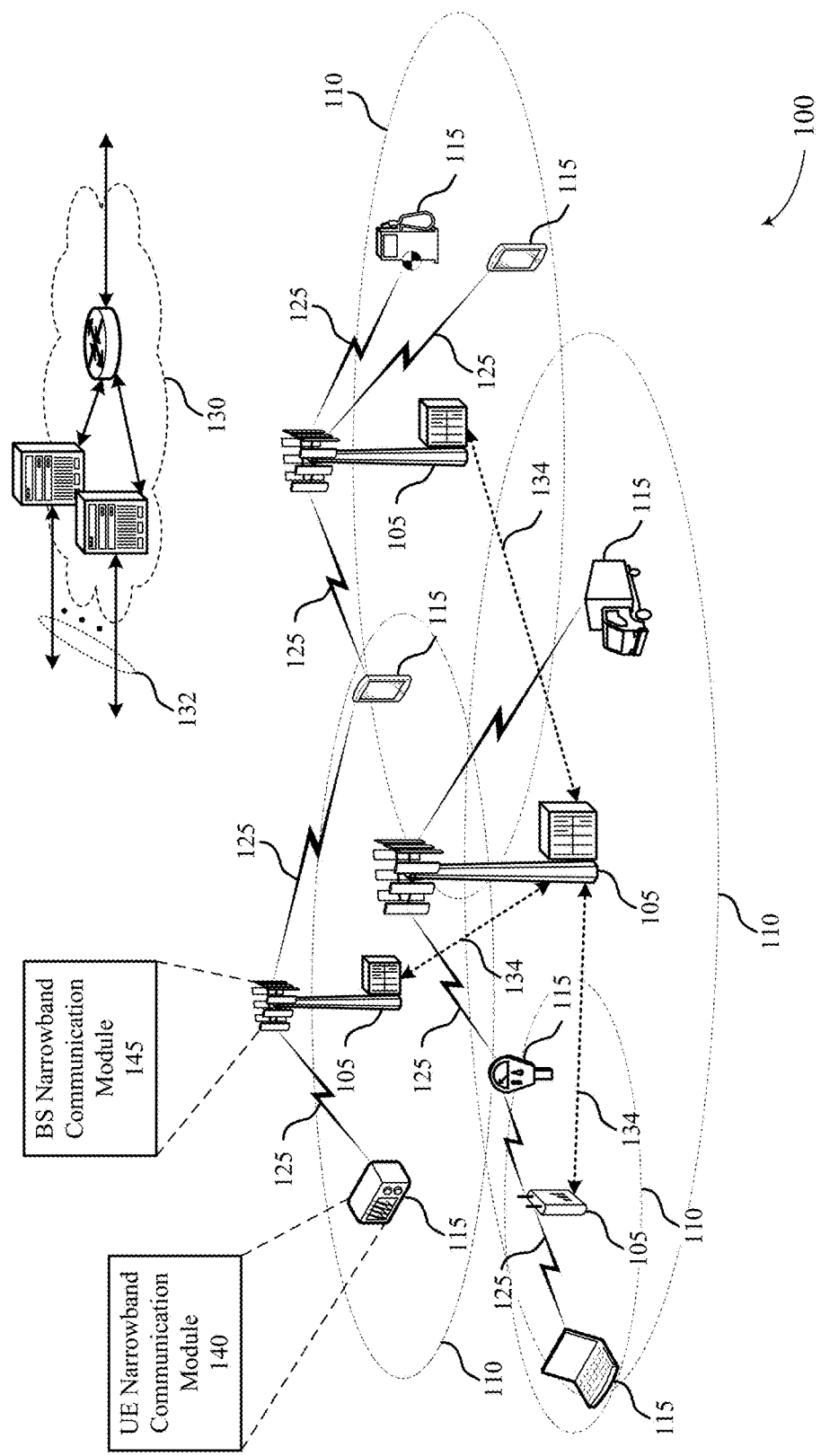
FIG. 1 illustrates an example of a wireless communications system that supports downlink and synchronization techniques for narrowband wireless communications in accordance with various aspects of the present disclosure.

Techniques are described for M2M communication that may utilize a narrowband region of a system operating frequency bandwidth. M2M communication or MTC refers to data communication technologies that allow automated devices to communicate with one another with little or no human intervention. For example, M2M and/or MTC may refer to communications from a device that integrate sensors or meters to measure or capture information and relay that information to a central server or application program that can make use of the information or present the information to humans interacting with the program or application. Such a device may be called a M2M device, an MTC device and/or an MTC UE. In some cases, networks of MTC devices communicating to each other or one or more servers may be referred to as the Internet of Things (IoT). In instances where the communication is performed over a cellular network, this may be referred to as a Cellular IoT (CIoT). In some deployments, CIoT devices may communicate using a relatively small portion of allocated bandwidth of a cellular network, which may be referred to as narrowband communication. Other portions of the allocated bandwidth, or system bandwidth, of the cellular network may be used for communications that have higher data rates and are referred to as wideband communications herein. In some examples, the narrowband communications may occupy 200 kHz of a radio frequency spectrum band, as compared to 1.4 MHz to 20 MHz system bandwidth.

In some deployments, CIoT devices may have a 164 dB Minimum Coupling Loss (MCL), which may be achieved through relatively high power spectral density (PSD). CIoT devices may have relatively high power efficiency requirements, and CIoT networks may routinely support a relatively large number of devices (e.g., a relatively large number of water meters, gas meters, electric meters in a given area). CIoT devices may be designed to have a relatively low cost as well, and thus may have hardware components that are specifically designed to operate in a power efficient manner and that do not have a significant amount of processing capabilities beyond what may be needed for narrowband communications. As mentioned above, in some deployments such MTC devices may operate with a 200 kHz channelization.

Various aspects of the disclosure provide techniques for narrowband communications in an LTE wireless communications network. In some aspects, narrowband MTC communications may be transmitted using a single resource block (RB) of a number of RBs used for wideband LTE communications. A UE using narrowband communications, however, may need to perform cell search within the single RB narrowband, and the signals used for search (PSS/SSS/PBCH) may need to be redesigned for single RB signaling. Further, since the single RB narrowband region may be used within a legacy wideband LTE region, some legacy LTE signals may need to be transmitted even within the narrowband region, such as CRS or legacy control region, which may interfere with the cell search signals. Whether the narrowband region is stand-alone or contained within a wideband region, these factors may impact the design for initial access for narrowband LTE. Further, the narrowband initial access design may be tailored for compatibility with both a stand-alone narrowband region and a narrowband region within a legacy wideband region.

In order to provide for efficient device discovery and synchronization using narrowband communications, some aspects provide a synchronization signal, such as a PSS or an SSS, that is transmitted within the single resource block. The synchronization signal may be transmitted, for example, using multiple orthogonal frequency division multiplexing (OFDM) symbols within the single RB. A CRS may also be present in the single resource block, which may puncture the synchronization signal, in some examples. In other examples, the synchronization signal may be mapped to non-CRS symbols of the single resource block.

In certain aspects of the disclosure, a base station may transmit, and a UE may receive, an indication of a location of the single resource block for narrowband transmissions within a wideband region of the system bandwidth. The UE may identify one or more synchronization parameters for receiving the narrowband transmissions based on the indication. The UE may, in some examples, select a decoding technique for decoding based on the identified frequency band of the narrowband transmissions, such as based on whether the identified frequency band is within a wideband transmission bandwidth or outside of the wideband transmission bandwidth. In other aspects, a set of subcarriers may be identified within the narrowband region of the system bandwidth used to transmit a resource block, and a center-frequency subcarrier of the set of subcarriers identified. One or more other subcarriers of the set of subcarriers may be modified based on the identification of the center-frequency subcarrier, such as through frequency shifting or power boosting, for example.

Aspects of the disclosure are initially described in the context of a wireless communication system. Specific examples are then described for narrowband MTC communications in an LTE system. These and other aspects of the disclosure are further illustrated by and described with reference to apparatus diagrams, system diagrams, and flowcharts that relate to downlink and synchronization techniques for narrowband wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-Advanced (LTE-A) network.

The base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, an MTC device or the like.

The base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller. In some examples, base stations 105 may be macro cells, small cells, hot spots, or the like. Base stations 105 may also be referred to as eNodeBs (eNBs) 105.

As mentioned above, some types of wireless devices may provide for automated communication. Automated wireless devices may include those implementing M2M communication or MTC. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, smart switches, inventory monitoring, water level monitoring, equipment monitoring, healthcare monitoring, wildlife monitoring, weather and geological event monitoring, fleet management and tracking, remote security sensing, physical access control, and transaction-based business charging, to name but a few examples. An MTC device may operate using half-duplex (one-way) communications at a reduced peak rate. MTC devices may also be configured to enter a power saving "deep sleep" mode when not engaging in active communications. According to various aspects of the present disclosure, MTC devices may operate using narrowband communications that may be located within a bandwidth of other wideband communications or outside of the bandwidth of other wideband communications.

As mentioned above, various aspects of the disclosure provide techniques for device discovery and synchronization using narrowband communications. In some examples, a UE 115 attempting to access a wireless network may perform an initial cell search by detecting a PSS from a base station 105. The PSS may enable synchronization of slot timing and may indicate a physical layer identity value. The UE 115 may then detect an SSS. The SSS may enable radio frame synchronization, and may provide a cell identity value, which may be combined with the physical layer identity value to identify the cell. The SSS may also enable detection of a duplexing mode and a cyclic prefix length. Some systems, such as time division duplex (TDD) systems, may transmit an SSS but not a PSS. Both the PSS and the SSS, according to established wideband techniques, may be located in the central 62 and 72 subcarriers of a carrier, respectively.

In certain aspects of the present disclosure, the PSS and the SSS may be located within a single RB, and may occupy multiple OFDM symbols of the single resource block in which they are transmitted, as compared to some wideband deployments that may have a single OFDM symbol with PSS or SSS within a single RB. After receiving the PSS and SSS, the UE 115 may receive a MIB, which may be transmitted in a PBCH. The MIB may contain system bandwidth information, a system frame number (SFN), and a physical HARQ indicator channel (PHICH) configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, SRS, and cell barring. After completing initial cell synchronization, a UE 115 may decode the MIB, SIB1 and SIB2 prior to accessing the network. The MIB may be transmitted on PBCH and may carry a few important pieces of information for UE initial access, including: downlink (DL) channel bandwidth in term of RBs, PHICH configuration (duration and resource assignment), and SFN. A new MIB may be broadcast periodically and rebroadcast every frame (10 ms). After receiving the MIB, a UE may receive one or more SIBs. Different SIBs may be defined according to the type of system information conveyed. SIB1 may include access information, including cell identity information, and it may indicate whether a UE is allowed to camp on a cell 105. SIB1 may also includes cell selection information (or cell selection parameters). Additionally, SIB1 includes scheduling information for other SIBs. SIB2 may be scheduled dynamically according to information in SIB1, and may include access information and parameters related to common and shared channels. The periodicity of SIB2 can be set to, for example, 8, 16, 32, 64, 128, 256 or 512 radio frames.

LTE systems may utilize OFDMA on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. As mentioned above, in examples that provide MTC communications using narrowband resources, corresponding narrowband bandwidth may be 200 kHz, which may include 180 kHz of subcarriers and a 20 kHz guard band. In such examples, the narrowband communications may occupy a single RB of an LTE system bandwidth, and there may be 12 sub-carriers.

A frame structure may be used to organize physical resources. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 REs. Some REs may include DL reference signals (DL-RS). The DL-RS may include a CRS, also referred to as a common reference signal, and a UE-specific RS (UE-RS). UE-RS may be transmitted on the resource blocks associated with physical downlink shared channel (PDSCH). The number of bits carried by each resource element may depend on the modulation scheme (the configuration of symbols that may be selected during each symbol period). Thus, the more resource blocks that a UE receives and the higher the modulation scheme, the higher the data rate may be.

Some base stations 105 may utilize a portion of the available downlink bandwidth to broadcast multimedia data to some or all UEs 115 within the coverage area 110. For example, a wireless communication system may be configured to broadcast mobile TV content, or to multicast live event coverage to UEs 115 located near a live event such as a concert or sporting event. In some cases, this may enable more efficient utilization of the bandwidth. These base stations may be referred to as multimedia broadcast multicast service (MBMS) or evolved multimedia broadcast multicast service (eMBMS) cells. In some cases, MBMS cells may be grouped together in an MBSFN wherein the broadcast media is transmitted on the same frequency resources by each supporting cell. However, some UEs 115 in the coverage area may elect not to receive the MBMS data. If a base station 105 configures a subframe as a MBSFN subframe, certain signals may not be transmitted in the subframe, such as CRS transmissions. A UE 115 may receive the indication that the subframe is a MBSFN subframe, and therefore may determine that a CRS will not be present in the subframe.

As mentioned, the base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 REs in each resource block based on the number of antenna ports or layers (up to 4) of the receiving UEs 115. In addition to CRS, which may be utilized by all UEs 115 in the coverage area 110 of the base station 105, a DMRS may be directed toward specific UEs 115 and may be transmitted only on resource blocks assigned to those UEs 115. DMRS may include signals on 6 REs in each resource block in which they are transmitted. The DM-RS for different antenna ports may each utilize the same 6 REs, and may be distinguished using different orthogonal cover codes (e.g., masking each signal with a different combination of 1 or −1 in different REs). In some cases, two sets of DMRS may be transmitted in adjoining REs. In some cases, additional reference signals known as channel state information reference signals (CSI-RS) may be included to aid in generating channel state information (CSI). On the UL, a UE 115 may transmit a combination of periodic sounding reference signal (SRS) and uplink (UL) DMRS for link adaptation and demodulation, respectively. DMRS transmissions may be precoded according to a particular precoding matrix index (PMI) for a particular UE 115. In some examples, when transmitting narrowband communications, a base station 105 may apply a same precoding matrix to transmissions in the single RB narrowband communication, which may allow a UE 115 to receive the signal without relying on a CRS transmission.

Various aspects of the disclosure provide techniques for narrowband communications in an LTE wireless communications network. In some aspects, narrowband MTC communications may be transmitted using a single RB of a number of RBs used for wideband LTE communications. In order to provide for efficient device discovery and synchronization using narrowband communications, some aspects provide a synchronization signal, such as a PSS or an SSS, that is transmitted within the single resource block. The synchronization signal may be transmitted, for example, using multiple OFDM symbols within the single RB. A CRS may also be present in the single resource block, which may puncture the synchronization signal, in some examples. In other examples, the synchronization signal may be mapped to non-CRS symbols of the single resource block.

In certain aspects of the disclosure, a base station may transmit, and a UE may receive, an indication of a location of the single resource block for narrowband transmissions within a wideband region of the system bandwidth. The UE may identify one or more synchronization parameters for receiving the narrowband transmissions based on the indication. The UE may, in some examples, select a decoding technique for decoding based on the identified frequency band of the narrowband transmissions, such as based on whether the identified frequency band is within a wideband transmission bandwidth or outside of the wideband transmission bandwidth. In other aspects, a set of subcarriers may be identified within the narrowband region of the system bandwidth used to transmit a resource block, and a center-frequency subcarrier of the set of subcarriers identified. One or more other subcarriers of the set of subcarriers may be modified based on the identification of the center-frequency subcarrier, such as through frequency shifting or power boosting, for example.

As shown herein, a UE 115 may include a UE narrowband communication module 140 which may perform the various techniques described herein. In one example, the UE narrowband communication module 140 may receive a synchronization signal for device discovery, the synchronization signal comprising two or more OFDM symbols within a single resource block transmitted in the narrowband region, and synchronize one or more parameters of transmissions in the narrowband region based at least in part on the synchronization signal.

Also shown in FIG. 1 is that a BS 105 may include a base station (BS) narrowband communication module 145. The BS narrowband communication module 145 may perform the various techniques described herein. For example, the BS narrowband communication module 145 may generate a synchronization signal for device discovery, the synchronization signal comprising two or more OFDM symbols within a single resource block, and transmit the synchronization signal in the narrowband region.

Figure 2:
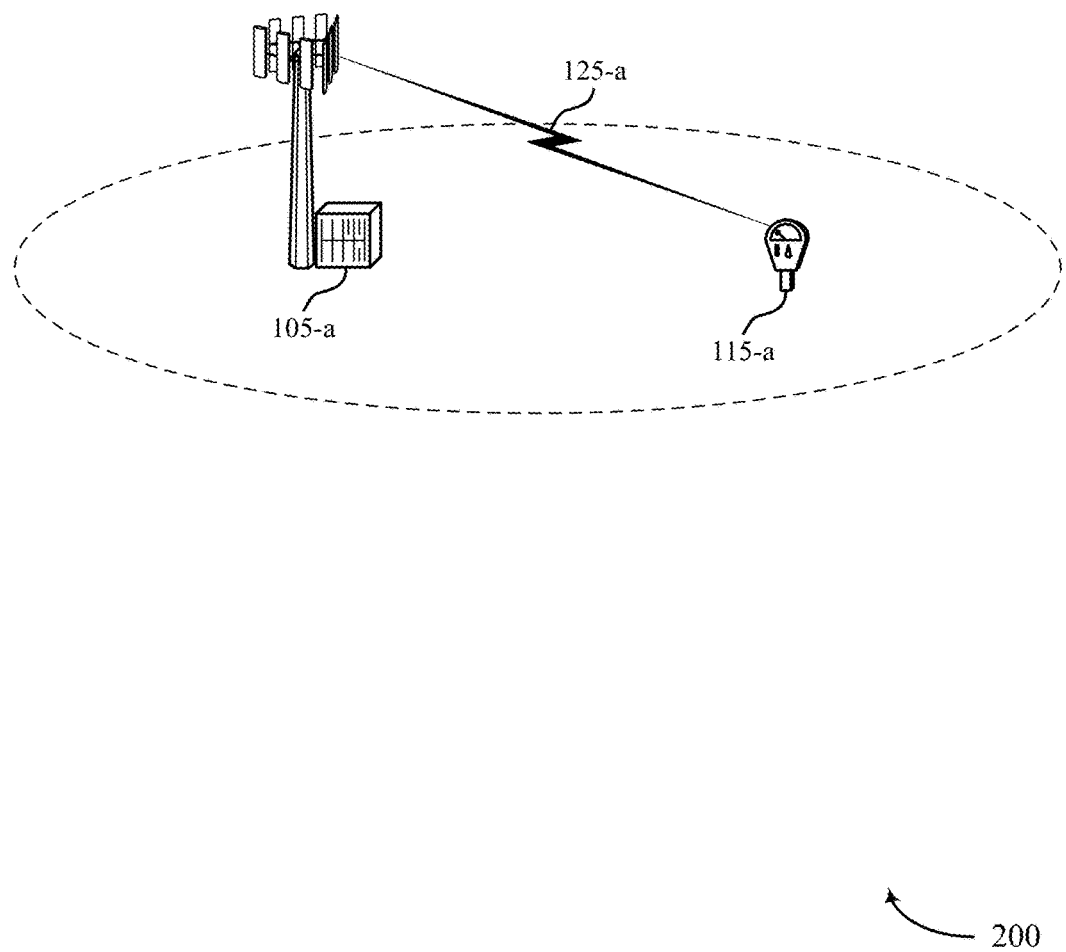
FIG. 2 illustrates an example of a wireless communications subsystem that supports downlink and synchronization techniques for narrowband wireless communications in accordance with various aspects of the present disclosure.

FIG. 2 illustrates an example of a wireless communications subsystem 200 for downlink and synchronization techniques for narrowband wireless communications in accordance with various aspects of the present disclosure. Wireless communications subsystem 200 may include a UE 115-*a* and base station 105-*a*, which may be examples of a UE 115 base station 105 described with reference to FIG. 1.

In some examples, UE 115-*a* is an MTC device, such as a smart meter, that may communicate with base station 105-*a* using narrowband communications over the communication link 125-*a*. In order to perform device discovery and synchronization, base station 105-*a* may generate a synchronization signal, such as a PSS and/or SSS, that may include two or more OFDM symbols within a single resource block, and transmit the synchronization signal in the narrowband region. The UE 115-*a* may receive the synchronization signal and synchronize one or more parameters of transmissions in the narrowband region based thereon. In some examples, decoding of the synchronization signals may depend upon whether the narrowband transmission is located within a transmission bandwidth of a wideband transmission (e.g., a LTE RB in a wideband LTE transmission), or located outside of the wideband transmission bandwidth. In cases where the narrowband transmission is within the wideband transmission bandwidth, the base station 105-*a* may identify a location of the RB and transmit an indication of the location to the UE 115-*a*. Such an indication may include, in some examples, a total wideband bandwidth of the system bandwidth and a resource block index that indicates a location of the single resource block. In other examples, the indication may simply indicate a RB offset from start of the wideband bandwidth.

Figure 3:
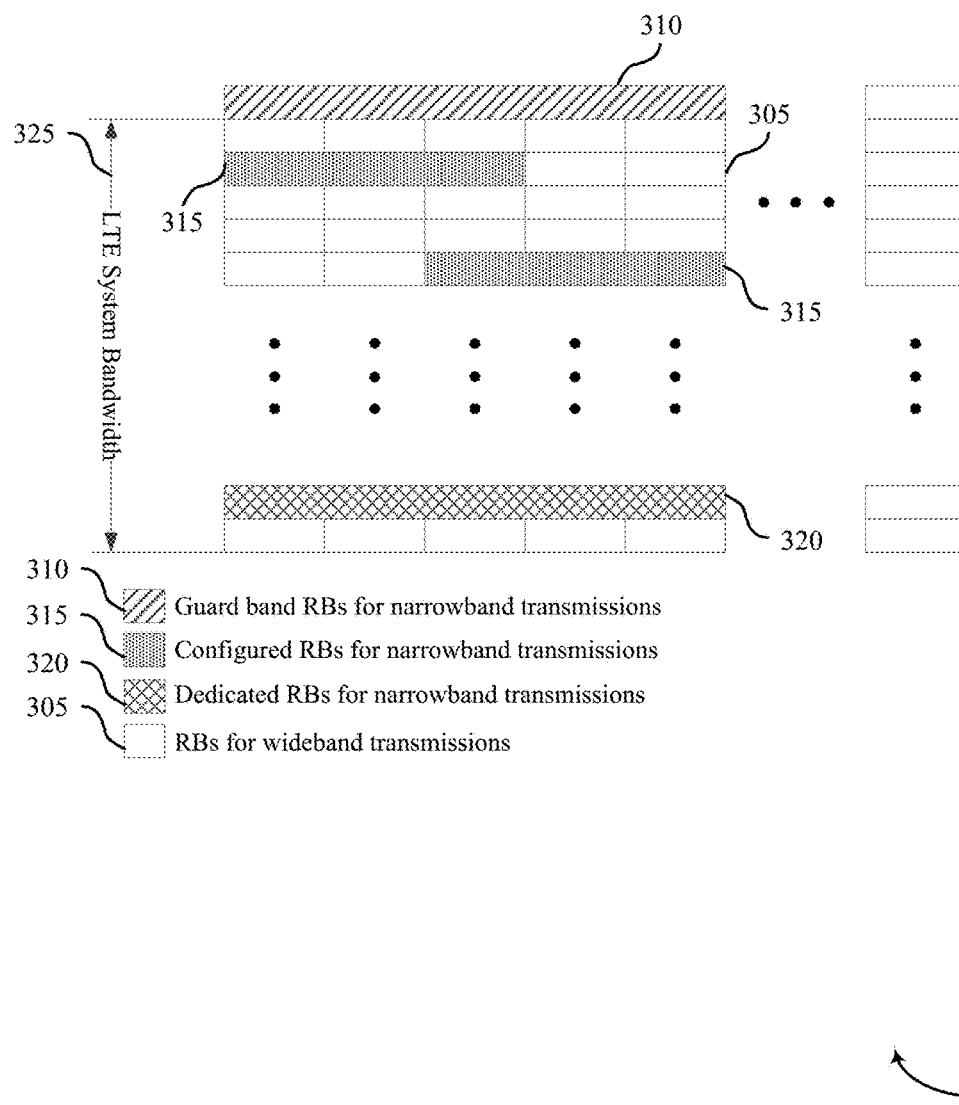
FIG. 3 illustrates an example of a system bandwidth and various options for placement of a narrowband transmission resource block within a system bandwidth that support downlink and synchronization techniques for narrowband wireless communications, in accordance with various aspects of the present disclosure.

FIG. 3 illustrates an example of a system bandwidth and various options 300 for placement of a narrowband transmission resource block within a system bandwidth that support downlink and synchronization techniques for narrowband wireless communications, in accordance with various aspects of the present disclosure. Options 300 may be used by wireless network devices, such as MTC type UEs 115 and base stations 105 described with reference to FIGS. 1-2. In some deployments, a number of RBs 305 may be used for wideband transmissions between a base station and various UEs. Narrowband MTC type UEs may be configured to receive a subset of the communications using a narrowband region of LTE system bandwidth 325, for example. In some instances, narrowband communications may be transmitted in a guard band 310 of an LTE system, which may be located outside of the LTE system bandwidth 325. In other examples, the narrowband communications may be transmitted in configured RBs 315 for narrowband transmissions, which may be signaled by a base station to UEs that may be served by the base station. In further examples, narrowband communications may be transmitted in a dedicated set of RBs 320 of LTE system bandwidth 325. These RBs 320 may be deployed in-band. In further examples, narrowband communications may be transmitted in a frequency band that may be allocated to communications of another radio access technology, such as in a frequency band allocated for GSM communications. A UE that receives communications, according to various aspects of the disclosure may be configured to identify a frequency band of the narrowband communications and select one or more decoding and synchronization techniques based on a particular frequency band.

Through the reuse of a LTE RB for narrowband communications, various higher layers of LTE systems, along with hardware of such systems, may be utilized in an efficient manner without a significant amount of additional overhead. Such techniques may also avoid fragmentation (e.g., a device could implement communications techniques that use differing amounts of transmission bandwidth). When using a narrowband signal that occupies a single RB, a UE may perform a cell search using only the narrowband signal, and thus a UE might not know that a configured RB for narrowband communications is placed inside the wideband LTE bandwidth 325, or if the RB is transmitted in a standalone deployment in a frequency band that is not within the wideband LTE bandwidth 325. Furthermore, even when a single RB is reserved for narrowband communications with LTE bandwidth 325, some legacy LTE signals may still be transmitted in this RB, such as CRS tones used by legacy UEs for tracking loops. Furthermore, legacy control regions (e.g., PDCCH) may be present in such a single RB for legacy UEs. In standalone configurations, there is no need to transmit these signals, as legacy UEs would not be served in such configurations. In some aspects of the disclosure, UEs may determine that narrowband communications are within a wideband system bandwidth, or outside of a wideband system bandwidth, and may process received signals accordingly. In some aspects, a unified, or similar, design is provided for both in-band narrowband communications and standalone communications. Various aspects of the disclosure, as will be discussed in more detail below, provide synchronization signal and PBCH techniques that may allow a UE to perform device discovery and synchronization using narrowband transmissions in multiple different types of deployments.

FIG. 4 illustrates an example of a resource element mapping 400 that supports downlink and synchronization techniques for narrowband wireless communications, in accordance with various aspects of the present disclosure. Resource element mapping 400 may be used by wireless network devices, such as UEs 115 and base stations 105 described with reference to FIGS. 1-2 that may operate using narrowband communications. As mentioned above, for communications that are within a bandwidth of wideband communications, various reference signals (e.g., CRS), may be configured to be transmitted in certain REs of certain RBs. Furthermore, certain synchronization signals (e.g., PSS and/or SSS) may be provided for device discovery and synchronization.

In the example of FIG. 4, a subframe 405 may include a number of RBs, including a narrowband (NB) RB 410. In this example, CRS REs 415 may be located in symbols 0, 4, 7, and 11 of a RB. In some examples, RBs 410-a and 410-b may be provided in consecutive subframes 405. Furthermore, PDCCH REs 420 may be provided in the first two symbols of RB 410. According to some examples, PSS REs 425 may be provided in multiple consecutive OFDM symbols, and SSS REs 430 may be provided in multiple consecutive OFDM symbols of a first RB 410-a. In such a manner, an entire synchronization signal may be contained in a single RB, and thus a UE that receives only the signal RB 410-a may perform device discovery and synchronization when receiving narrowband transmissions that occupy a single RB in wideband transmissions. As discussed above, CRS REs 415 may be present in certain OFDM symbols, and in the example of FIG. 4, these CRS REs 415 puncture the PSS REs 425 and SSS REs 430. Such puncturing may create some additional interference in the PSS/SSS synchronization signals. In other examples, a base station may configure the PSS/SSS subframe that contains the first RB 410-a as a MBSFN subframe, and thus no CRS will be present in that subframe. In some instances, a subframe 410 may already be configured as a MBSFN subframe, and thus no CRS will be present in the transmissions without the base station having to reconfigure the subframe 410. A second RB 410-b may include PBCH REs 435, which may be transmitted using a DMRS, according to some examples, as will be discussed in more detail below.

Figure 5:
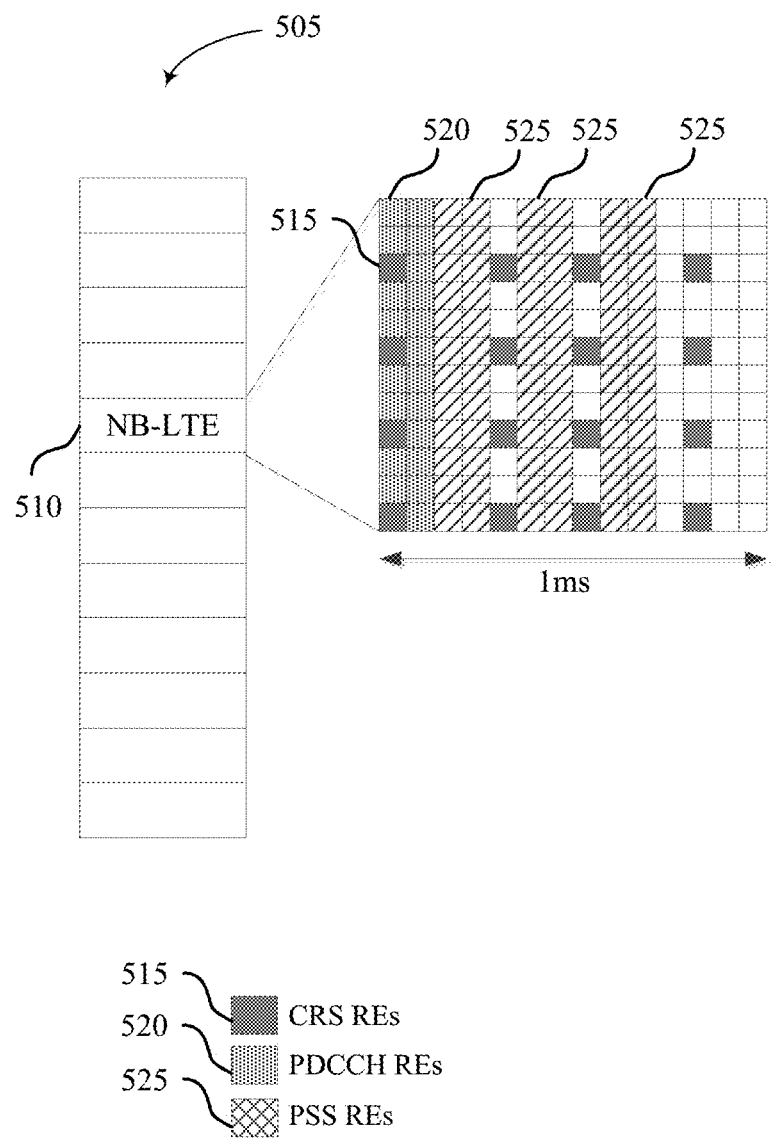
FIG. 5 illustrates another example of a resource element mapping that supports downlink and synchronization techniques for narrowband wireless communications, in accordance with various aspects of the present disclosure.

In other examples, a base station may map synchronization signals such that they are not transmitted in OFDM symbols that include CRS REs. FIG. 5 illustrates such an example of a resource element mapping 500 that supports downlink and synchronization techniques for narrowband wireless communications, in accordance with various aspects of the present disclosure. Resource element mapping 500 may be used by wireless network devices, such as UEs 115 and base stations 105 described with reference to FIGS. 1-2 that may operate using narrowband communications.

In the example of FIG. 5, a subframe 505 may include a number of RBs, including a narrowband RB 510. In this example, CRS REs 515 are again located in symbols 0, 4, 7, and 11 of RB 510. Furthermore, PDCCH REs 520 may be provided in the first two symbols of RB 510. According to some examples, PSS REs 525 may be mapped such that they are not transmitted in symbols that include CRS REs 515. In such a manner, an entire synchronization signal may be contained in a single RB, and thus a UE that receives only the signal RB 510 may perform device discovery and synchronization when receiving narrowband transmissions that occupy a single RB in wideband transmissions. IN a similar manner, SSS REs could be transmitted in a separate RB and mapped to avoid symbols that contain CRS REs 515. In some examples, a different design for PSS/SSS is provided for in-band and out-of-band narrowband communications, in which in-band narrowband communications have synchronization signals that are mapped to avoid CRS REs, and in which standalone narrowband communications have synchronization signals that occupy consecutive OFDM symbols. Thus, a UE is able to know if the narrowband communications are in a standalone frequency band or are in-band after receiving the synchronization signal.

Figure 6:
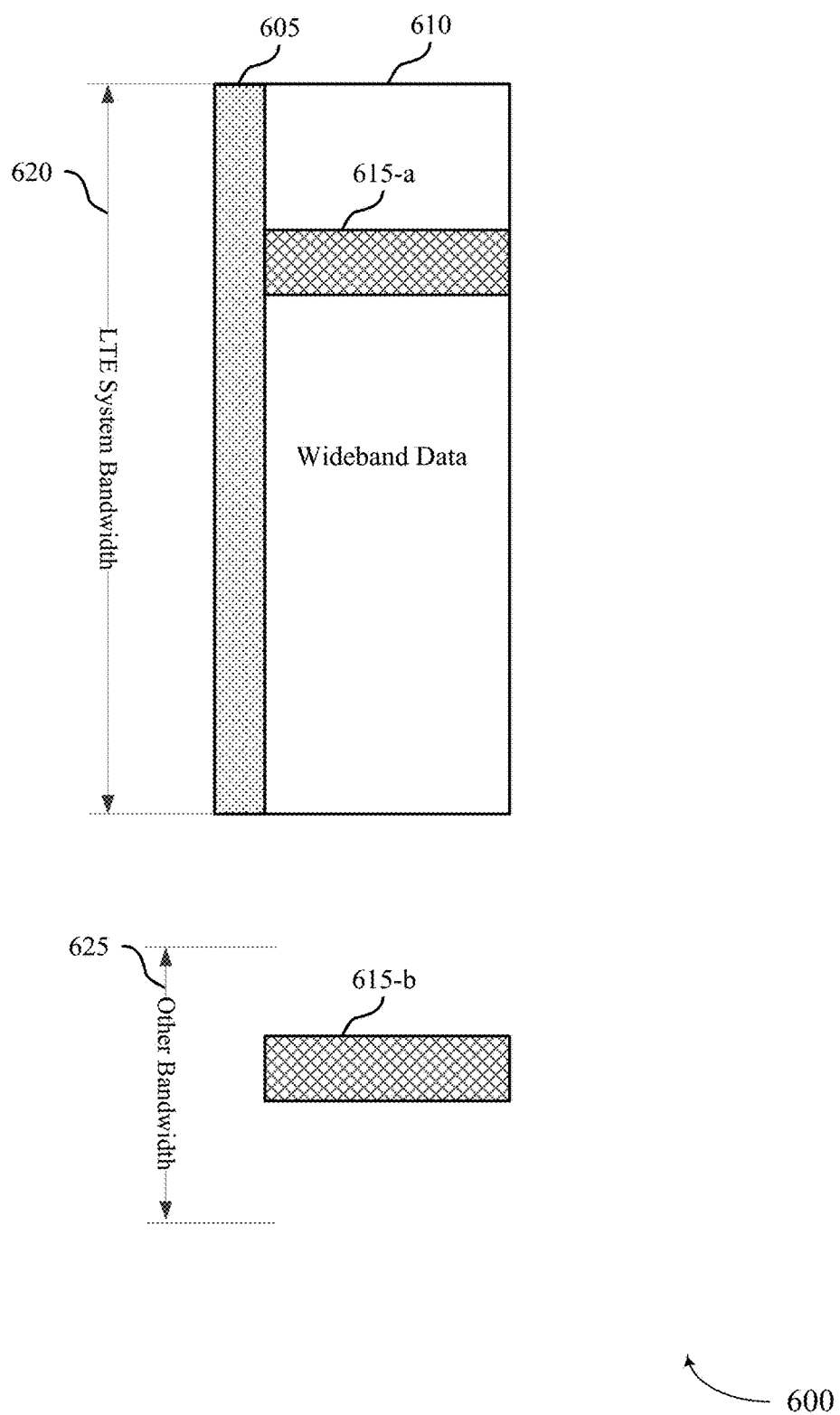
FIG. 6 illustrates an example of a narrowband region within a transmission bandwidth of a wideband transmission and a narrowband region in another allocated frequency band support downlink and synchronization techniques for narrowband wireless communications, in accordance with various aspects of the present disclosure.

FIG. 6 illustrates an example 600 of a narrowband region within a transmission bandwidth of a wideband transmission and a narrowband region in another allocated frequency band support downlink and synchronization techniques for narrowband wireless communications, in accordance with various aspects of the present disclosure. Example 600 may be used by wireless network devices, such as UEs 115 and base stations 105 described with reference to FIGS. 1-2 that may operate using narrowband communications.

In the example of FIG. 6, LTE system bandwidth 620 may include control region 605, a wideband data region 610, and first narrowband region 615-a. A second narrowband region 615-b may be provided for standalone narrowband communications, and may be located in some other bandwidth 625, such as a bandwidth allocated for GSM communications, for example.

In some examples, first narrowband region 615-a may occupy a single RB (e.g., 12 subcarriers) of wideband data region 610. In one example, (e.g., for a 20 MHz carrier) wideband data region 610 may include 100 RBs (1200 subcarriers). The particular narrowband region 615-a or 615-b may be configured for narrowband communications based on various deployment parameters, such as the availability of one or more frequency bands that are outside of LTE system bandwidth 620, the usage of the LTE system bandwidth 620 by other devices, to name but two examples. In some examples, a base station may provide an indication to UEs whether the narrowband region 615-a or 615-b is within a wideband bandwidth. Such an indication may create some overhead (e.g., due to transmission on MIB/SIB), but enables some design options. For example, with knowledge of whether the narrowband region 615-a or 615-b is within a wideband bandwidth may enable frequency hopping, in which base stations and UEs using narrowband communication may achieve frequency diversity by retuning in both uplink and downlink. Further, such knowledge may enable the re-use of CRS tones. For example, if a UE knows the position inside the wideband bandwidth of the narrowband RB, the wideband CRS tones can be re-used for tracking/demodulation. If no CRS are used in standalone (e.g. all channels and loops are based on DMRS), then the UE may benefit from the knowledge of whether CRS are present or not for rate matching purposes, for example.

In some examples, knowing the presence of CRS tones might be used for rate matching purposes. For example, a cell that does not have CRS may use the CRS tones for transmissions of data and control, whereas a cell that has CRS transmission may rate match control and data around the CRS tones. Additionally or alternatively, the base station may provide information about the number of CRS ports. For example, a base station that operates in standalone mode can signal to have 0 CRS ports. For in-band deployments, the base station may signal the actual number of CRS antenna ports (e.g., 1, 2 or 4). For guard band deployment, the base station may signal the actual number of CRS antenna ports, or 0 CRS ports. The information about the number of CRS ports may be broadcasted by the eNB. In one example, information about the number of CRS ports can be contained in MIB or SIB. In another example, information about the number of CRS ports can be transmitted by scrambling the PBCH CRC by different sequences depending on the number of antenna ports. In such cases, the scrambling sequence used for 0 CRS ports may also imply that the deployment mode is standalone.

In some examples, a base station may provide an indication to UEs, which may include the wideband bandwidth of LTE system bandwidth 620, and the RB index of the narrowband region to be used inside the wideband bandwidth. If a 20 MHz bandwidth is assumed, the RB index of narrowband region 615-a may be signaled using 9 bits, which in some examples may be reduced to eight bits by removing some available RBs as options for narrowband region 615-a. In other examples, a base station may simply signal an offset, which may be signaled using seven bits (assuming 20 MHz LTE system bandwidth 620). A UE may receive such an indication and identify one or more synchronization parameters for receiving the narrowband transmissions, and may generate a CRS sequence, in some examples, based on the cell ID and a resource block offset value included in the indication. In further examples, a base station may provide the indication through the presence or absence of CRS tones, and in some cases a number of transmit antennas, using one or two bits. After determining this information, a UE may rate match around CRS tones, but may not be able to utilize CRS for loops or channel estimation. In some examples, signaling of whether narrowband region 615-a is within LTE system bandwidth 620 may be included in MIB/SIB transmissions.

As mentioned above, in some examples PBCH transmissions using narrowband transmissions may be transmitted, and some aspects of the disclosure provide that a UE does not need to use CRS to demodulate such PBCH transmissions. In some examples, PBCH transmissions may be DMRS based, and thus a UE receiving the transmissions does not need to receive a CRS to demodulate PBCH transmissions. In some examples, precoding(s) for PBCH transmissions may be fixed, so that after a MIB is decoded for the first time, the CRS tones can be reused for channel estimation by a UE. In other examples, PBCH transmissions may be transmitted in MBSFN subframes, so no CRS tones are present. In certain examples, CRS tones may be inserted with an offset of zero, which may allow a UE to perform enhanced tracking/demodulation. In further examples, PBCH decoding may depend on the frequency band of the narrowband transmissions. For example, if the narrowband transmission frequency band is allocated to GSM spectrum, then a UE may determine that the narrowband transmission is a standalone transmission outside of a wideband transmission bandwidth, so CRS (or CRS+DMRS) can be used from the first acquisition of PBCH transmissions. If the frequency band of the narrowband transmission allocated within an LTE system bandwidth, for example, then the UE may know that PBCH is transmitted using DMRS or in a MBSFN subframe. This information can be pre-programmed in a UE, according to some examples.

Figure 7:
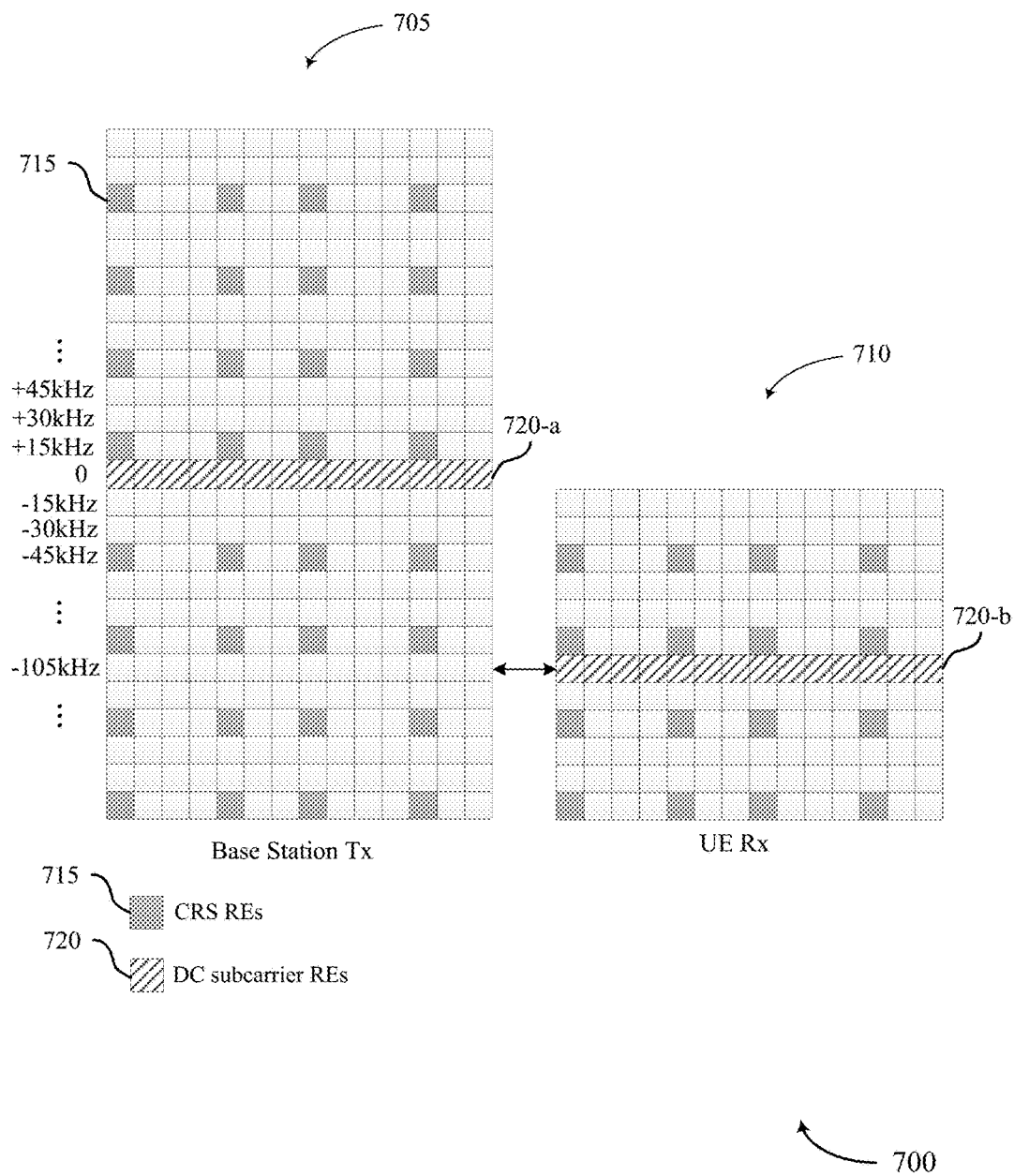
FIG. 7 illustrates an example of a different center frequency sub-carriers for a wideband transmission and a narrowband transmission, in accordance with various aspects of the present disclosure.

FIG. 7 illustrates an example 700 of a different center frequency sub-carriers for a wideband transmission and a narrowband transmission, in accordance with various aspects of the present disclosure. Example 700 may be used by wireless network devices, such as UEs 115 and base stations 105 described with reference to FIGS. 1-2 that may operate using narrowband communications.

In the example of FIG. 7, wideband transmissions 705 may be transmitted using a number of subcarriers, with a center frequency, or DC subcarrier, 720-a having a zero frequency offset Such a DC subcarrier 710-a is not used for data transmissions, and both UEs and base stations may be configured such that the DC subcarrier 720-a is not used for data transmissions. In narrowband transmissions 710, however, a MTC UE may be configured to receive narrowband communications, and a DC subcarrier 720-b may be offset from DC subcarrier 720-a. Thus, for in-band deployments, a narrowband UE receive DC subcarrier 720-b is not aligned with the base station transmit DC subcarrier 720-a. Thus, for in-band deployments DC leakage may eliminate one tone for RB, which implies that 1/12 tones may not be used for data. For standalone deployments, such an offset may not be present, although if only the center subcarrier is to remain unused, then the RB may be provided with 13 subcarriers (195 kHz in total bandwidth).

For in-band deployments, in some examples, a UE may simply lose the DC subcarrier REs 720-b. In such examples, the UE may signal to the base station that it is losing that carrier, and the base station may rate match around DC subcarrier REs 720-b and power boost the other tones. In other examples, the UE may apply a half-tone shift at the receive end, such that the DC leakage is split mainly between the two center subcarriers. In further examples, for standalone deployment, the base station may generate the digital waveform with an offset of half a subcarrier and adjust the transmitted local oscillator to take into account that offset, in which case the DC impact will be mainly taken by the center two subcarriers.

According to some examples, the waveform for the synchronization signal may be generated to provide good cross-correlation properties. In some examples, a PSS waveform may be generated using a Zadoff-Chu sequence. As discussed above, in some narrowband deployments a PSS may use 180 kHz, and 6 OFDM symbols. For the OFDM symbols, with short CP, there will be approximately 77 DFT samples. The next prime number is thus 79 for purposes of a Zadoff-Chu sequence. FIGS. 8A-8C illustrate examples of a sequence generation that supports downlink and synchronization techniques for narrowband wireless communications in accordance with various aspects of the present disclosure.

Figure 9:
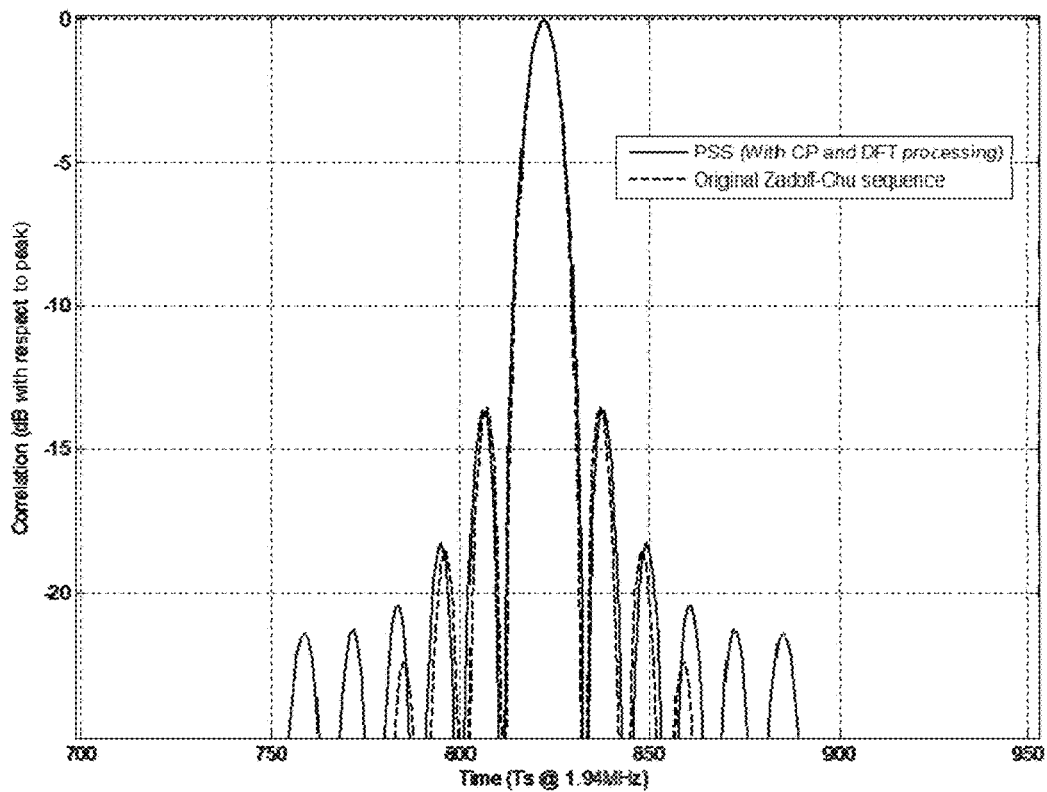
FIG. 9 illustrates an example of cross-correlation properties of an exemplary sequence generated in accordance with various aspects of the present disclosure.

In the waveform generation process, according to some examples, a length-79 Zadoff-Chu sequence may be generated. Such a length-79 Zadoff-Chu sequence is illustrated in the example 800 of FIG. 8A. In some examples, the sequence may be differentially encoded. After the length-79 Zadoff-Chu sequence is generated, the sequence is interpolated using length 822 inverse discrete Fourier transform (IDFT), to generate an oversampled time-domain waveform 820 of FIG. 8B (822 is the number of samples at 1.92 MHz). The oversampled time-domain waveform is then split into 6 parts of length 137 each. For each part, the first nine samples may discarded, for replacement by the corresponding CP. The remaining 128 samples are pre-processed in the frequency domain in which (1) a length 128 FFT is applied, (2) windowing in frequency domain is applied to keep only the 12 center subcarriers (FIG. 8C), and (3) a length 128 IFFT is applied, to generate time domain signal 840. Following this, usual DFT processing may be performed, such as IDFT and CP addition. FIG. 9 illustrates an example 900 of auto-correlation properties of an exemplary sequence generated in accordance with FIGS. 8A-8C.

Figure 10:
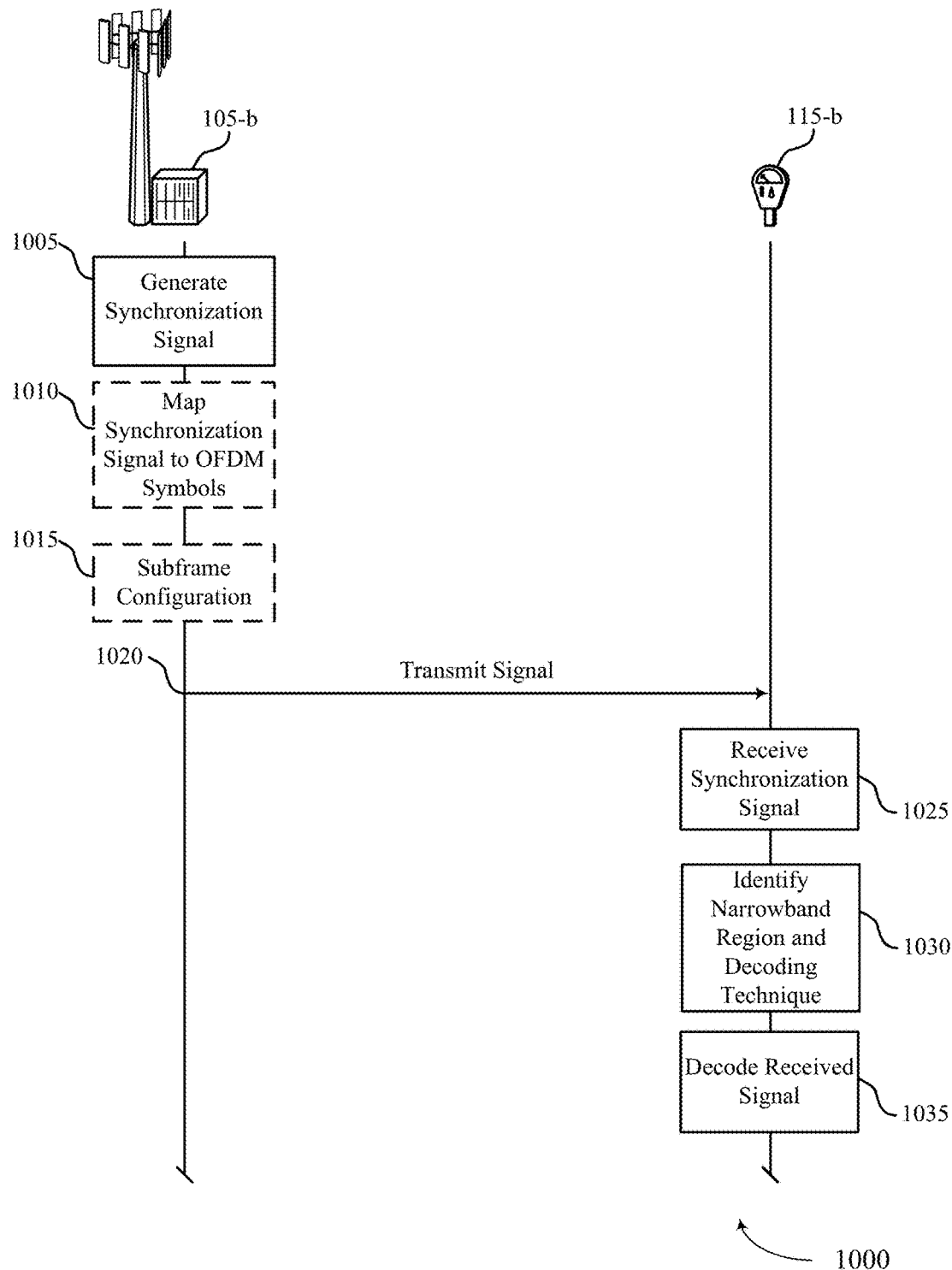
FIGS. 10-13 illustrate examples of process flows that support downlink and synchronization techniques for narrowband wireless communications in accordance with various aspects of the present disclosure.

FIG. 10 illustrates an example of a process flow 1000 for downlink and synchronization techniques for narrowband wireless communications in accordance with various aspects of the present disclosure. Process flow 1000 may include a UE 115-b and base station 105-b, which may be examples of a UE 115 and base station 105 described with reference to FIGS. 1-2.

Initially, at block 1005, the base station 105-b may generate a synchronization signal, such as discussed above with respect to FIGS. 1-9. At block 1010, the base station 105-b may optionally map the synchronization signal to OFDM symbols. For example, the base station 105-b may map the synchronization signal such that OFDM symbols that include a CRS are not used for transmission of the synchronization signal. At block 1015, the base station 105-b may optionally configure a subframe used for synchronization signal transmission. For example, base station 105-b may configure a subframe as a MBSFN subframe, such that the subframe will not include CRS transmissions. In another example, base station 105-b may map the synchronization signal to OFDM symbols if operating inside a wideband, and transmit the raw oversampled synchronization signal (e.g., signal 820 of FIG. 8B) if operating in standalone mode. The base station 105-b may then transmit signal 1020 to UE 115-b.

At the UE 115-b, the synchronization signal may be received at block 1025. At block 1030, the UE 115-b may identify a narrowband region of the transmission and an associated decoding technique. Such a narrowband region may be identified as an in-band region that is in-band with wideband transmissions, or as an out-of-band region, and decoding techniques may be selected based on such an identification, as discussed above with respect to FIGS. 1-9. At block 1035, the UE 115-b may decode the received signal.

Figure 11:
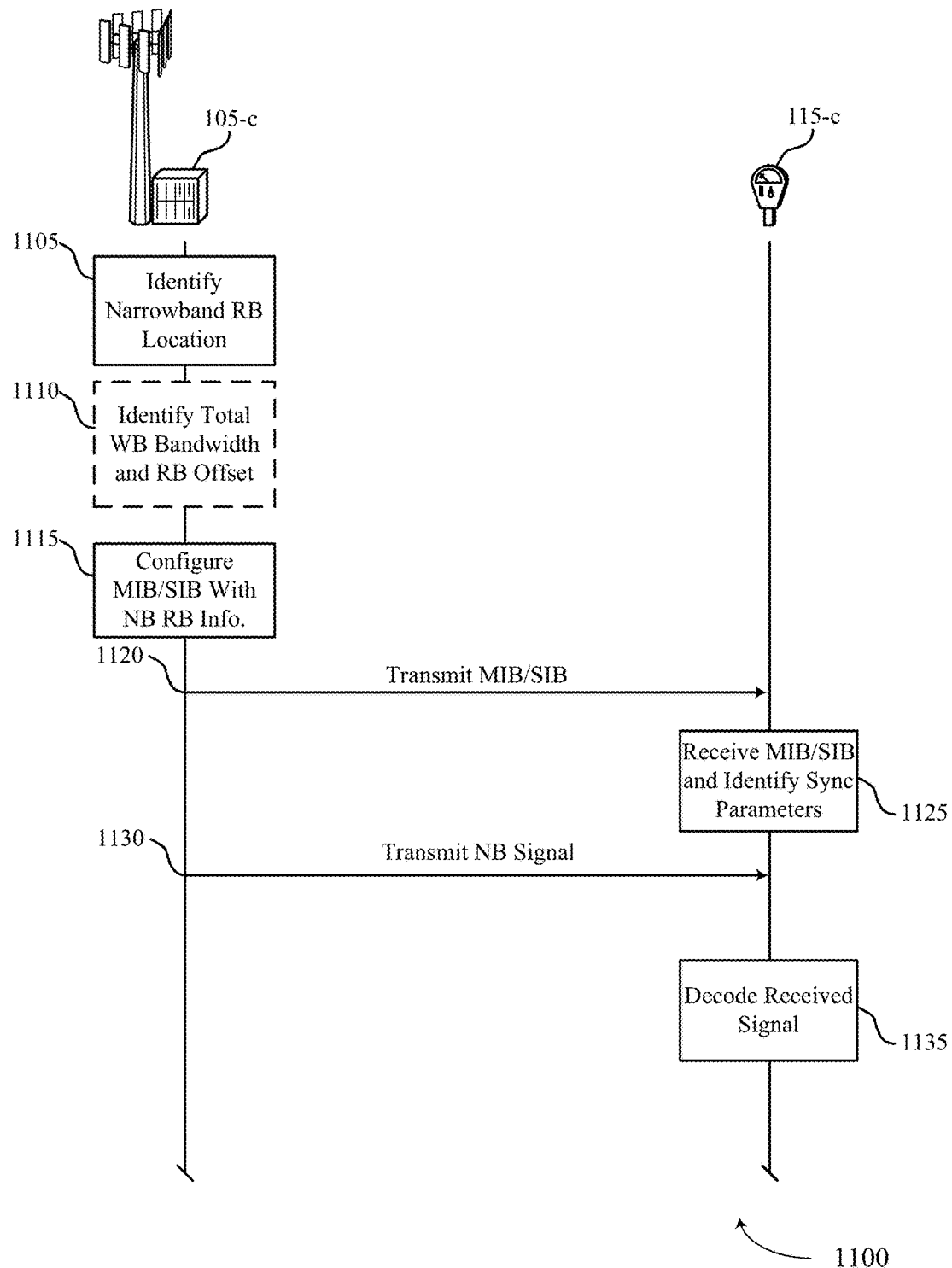

FIG. 11 illustrates an example of a process flow 1100 for downlink and synchronization techniques for narrowband wireless communications in accordance with various aspects of the present disclosure. Process flow 1100 may include a UE 115-c and base station 105-c, which may be examples of a UE 115 and base station 105 described with reference to FIG. 1-2, or 10.

Initially, at block 1105, the base station 105-c may identify a narrowband RB location, such as a location within a wideband transmission bandwidth or in a separate standalone bandwidth, as discussed above. At block 1110, the base station 105-c may optionally identify a total wideband bandwidth and a RB offset within the wideband bandwidth. In other examples, the base station 105-c may identify a RB offset without the total wideband bandwidth. At block 1115, the base station 105-c may configure a MIB/SIB with the narrowband RB information. The base station 105-c may transmit the MIB/SIB 1120 to UE 115-c. At block 1125, the UE 115-c may receive the MIB/SIB and identify synchronization parameters, in a manner such as discussed above. The base station 105-c may then transmit narrowband signal 1130, and the UE 115-c, at block 1135, may receive and decode the signal.

Figure 12:
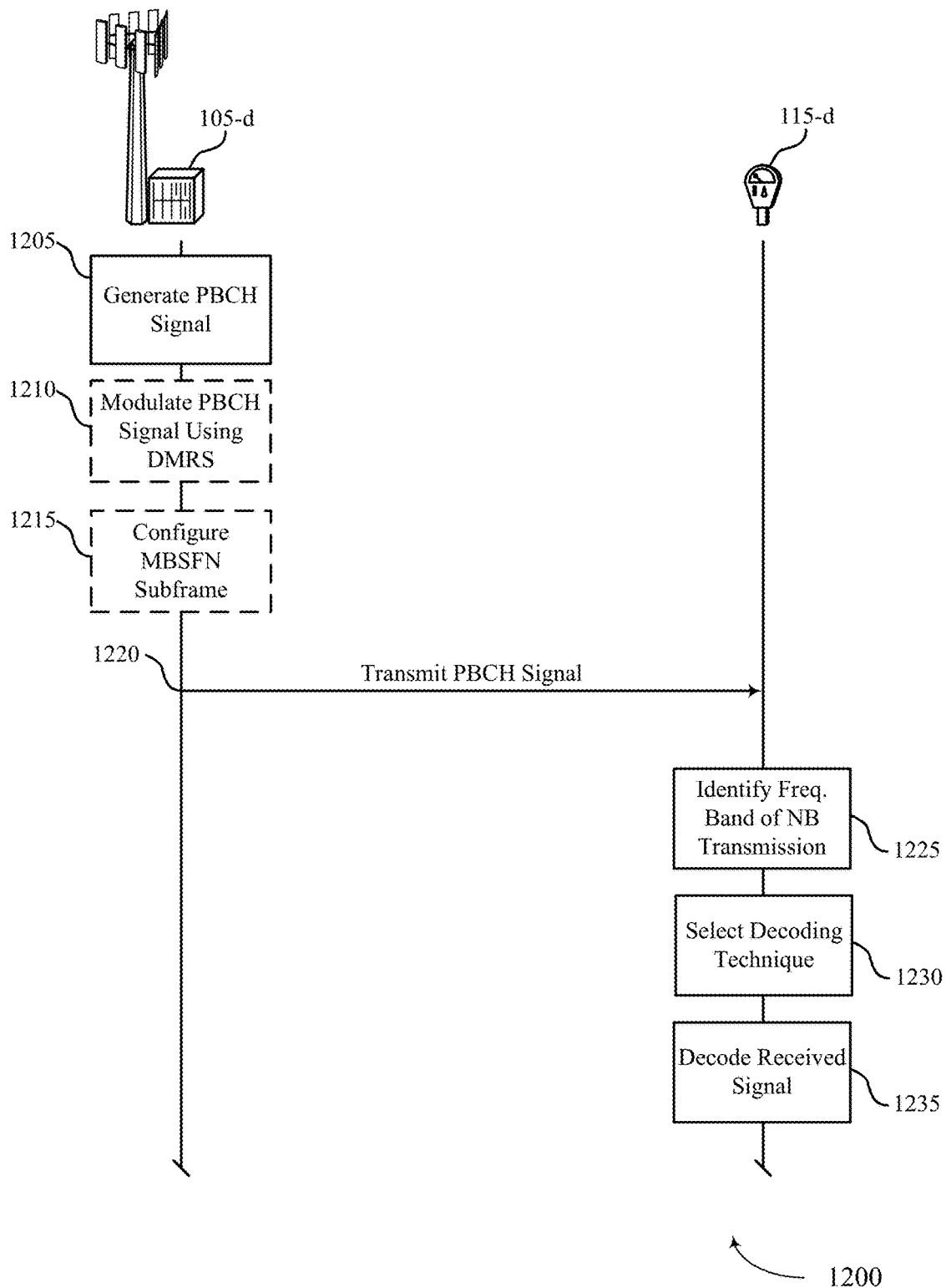

FIG. 12 illustrates an example of a process flow 1200 for downlink and synchronization techniques for narrowband wireless communications in accordance with various aspects of the present disclosure. Process flow 1200 may include a UE 115-d and base station 105-d, which may be examples of a UE 115 and base station 105 described with reference to FIG. 1-2, or 10-11.

Initially, at block 1205, the base station 105-d may generate a PBCH signal. The base station 105-d may optionally, at block 1210, modulate the PBCH signal using a DMRS, as discussed above with reference to FIGS. 1-9. At block 1215, the base station 105-d may optionally configure a subframe to transmit the PBCH signal as a MBSFN subframe, also as discussed above. The base station 105-d may transmit PBCH signal 1220. The UE 115-d may identify a frequency band of the narrowband transmission, according to block 1225. At block 1230 the UE 115-d may select a decoding technique based on the identification of the frequency band. At block 1235, the UE 115-d may decode the received signal, as discussed above with respect to FIGS. 1-9.

Figure 13:
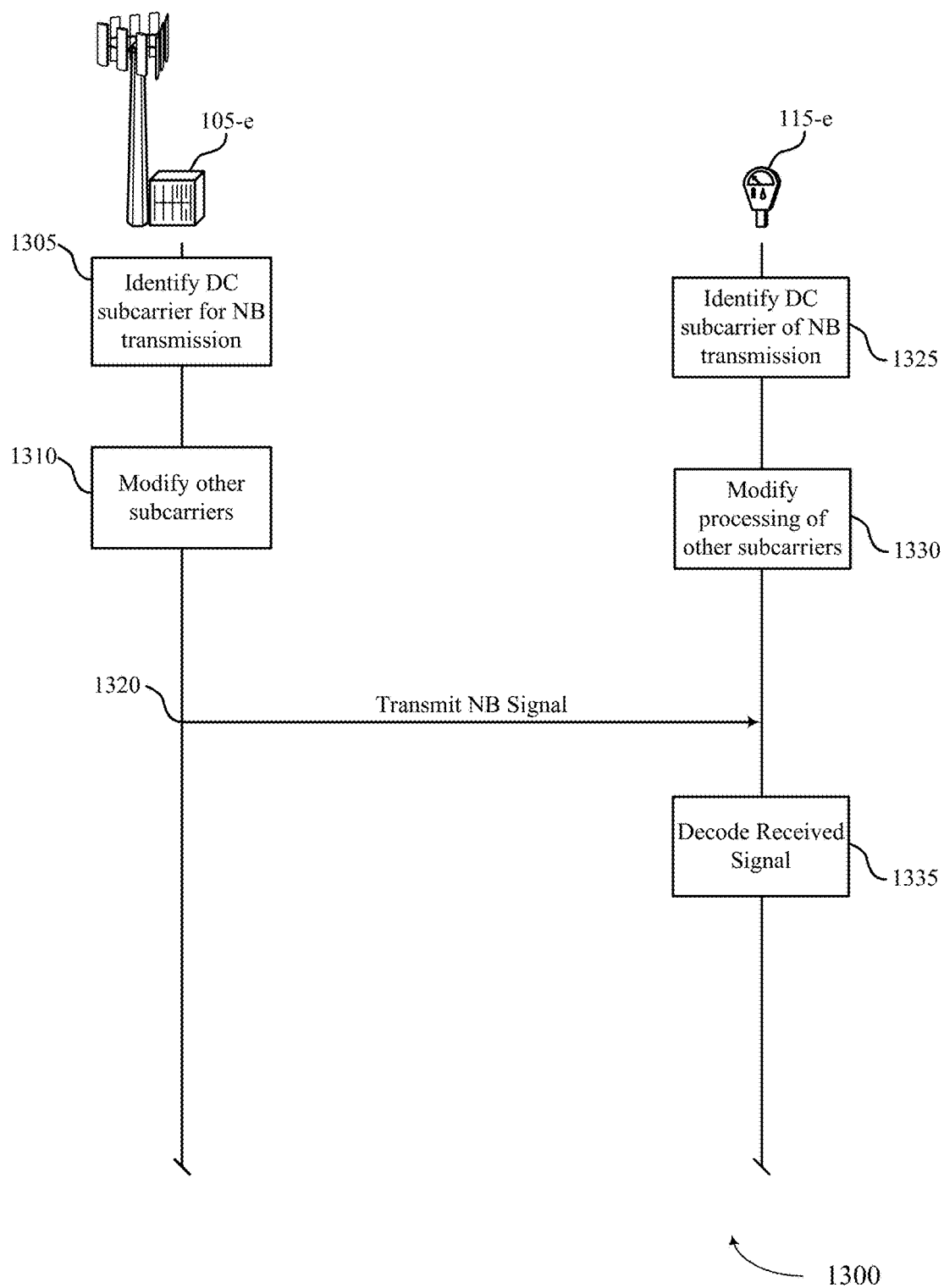

FIG. 13 illustrates an example of a process flow 1300 for downlink and synchronization techniques for narrowband wireless communications in accordance with various aspects of the present disclosure. Process flow 1300 may include a UE 115-e and base station 105-e, which may be examples of a UE 115 and base station 105 described with reference to FIG. 1-2, or 10-12. At block 1305, the base station 105-e may identify a DC subcarrier for a narrowband transmission. The base station 105-e may then, at block 1310, modify other subcarriers (e.g., by rate matching or power boosting), as discussed above with respect to FIGS. 1-9. The base station 105-e may transmit narrowband signal 1320 to UE 115-e. Similarly, the UE 115-e may identify a DC subcarrier for a narrowband transmission, as indicated at block 1325. The UE 115-e may then, at block 1330, modify processing of other subcarriers (e.g., by frequency shifting or power boosting), as discussed above with respect to FIGS. 1-9. The UE 115-e may receive narrowband transmission 1320, and decode the received signal at block 1335.

Figure 14:
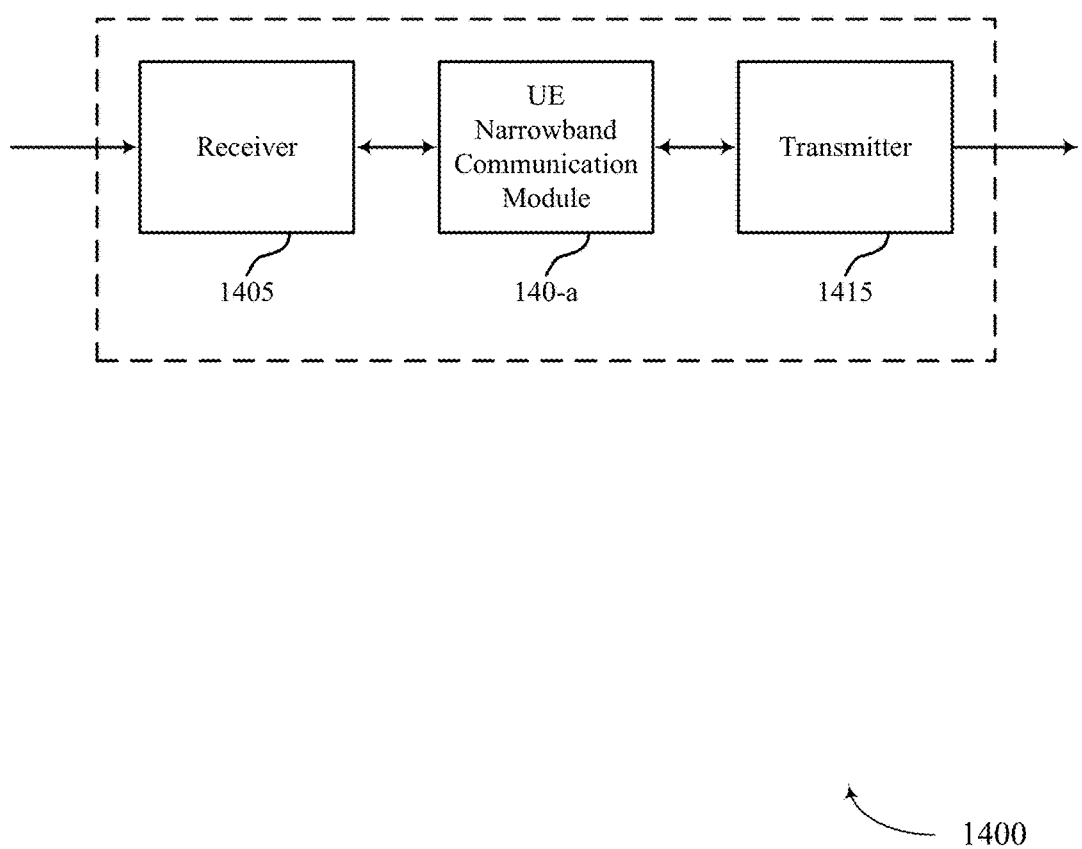
FIGS. 14-16 show block diagrams of a wireless device that supports downlink and synchronization techniques for narrowband wireless communications in accordance with various aspects of the present disclosure.

FIG. 14 shows a block diagram of a wireless device 1400 configured for downlink and synchronization techniques for narrowband wireless communications in accordance with various aspects of the present disclosure. Wireless device 1400 may be an example of aspects of a UE 115 described with reference to FIGS. 1-13. Wireless device 1400 may include a receiver 1405, a narrowband communication module 140-a, or a transmitter 1415. The narrowband communication module 140-a may be an example of the UE narrowband communication module 140 described with reference to FIG. 1. Wireless device 1400 may also include a processor. Each of these components may be in communication with each other.

The receiver 1405 may receive information such as packets, user data, or control information associated with various information channels (e.g., control channels, data channels, and information related to downlink and synchronization techniques for narrowband wireless communications, etc.). Information may be passed on to the narrowband communication module 140-a, and to other components of wireless device 1400.

The narrowband communication module 140-*a* may receive a synchronization signal for device discovery, the synchronization signal comprising two or more OFDM symbols within a single resource block transmitted in the narrowband region, and synchronize one or more parameters of transmissions in the narrowband region based at least in part on the synchronization signal.

The transmitter 1415 may transmit signals received from other components of wireless device 1400. In some examples, the transmitter 1415 may be collocated with the receiver 1405 in a transceiver module. The transmitter 1415 may include a single antenna, or it may include a plurality of antennas.

Figure 15:
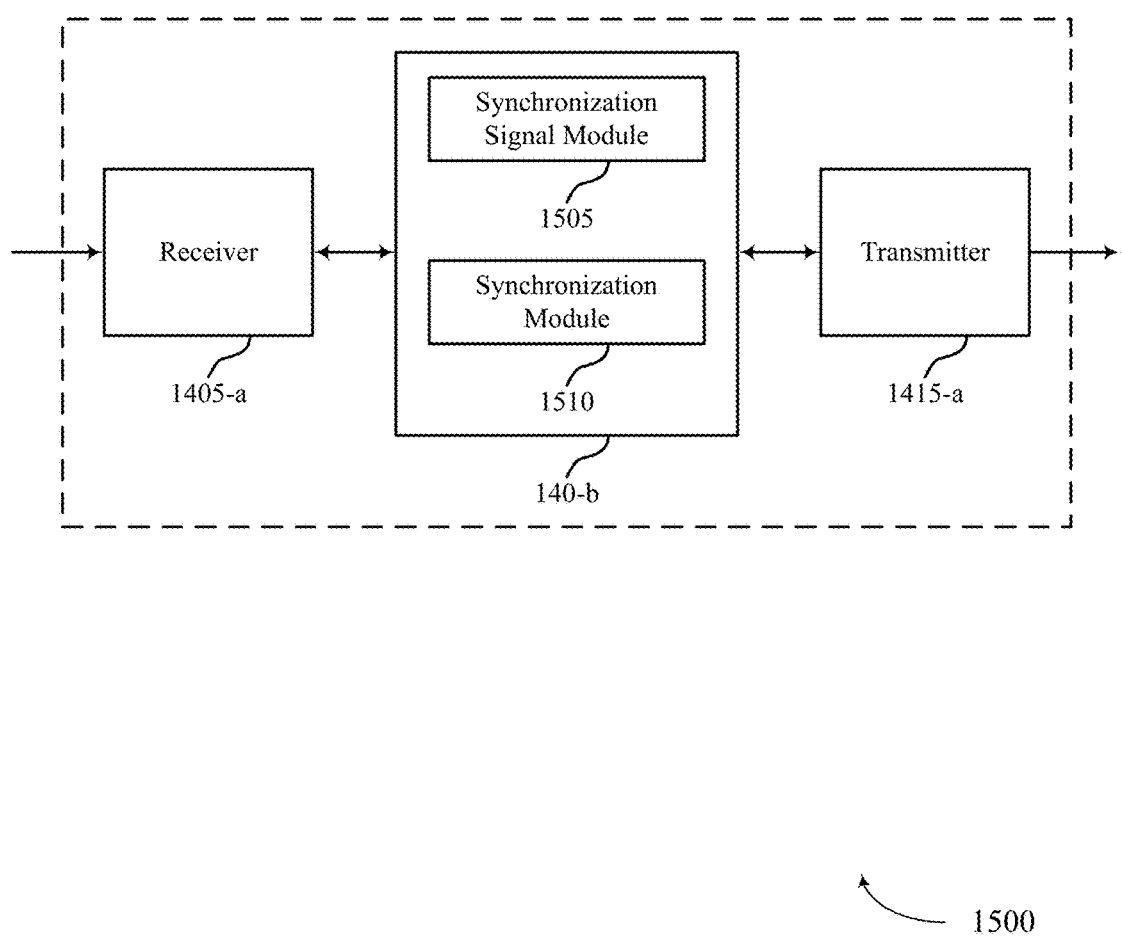

FIG. 15 shows a block diagram of a wireless device 1500 for downlink and synchronization techniques for narrowband wireless communications in accordance with various aspects of the present disclosure. Wireless device 1500 may be an example of aspects of a wireless device 1400 or a UE 115 described with reference to FIGS. 1-14. Wireless device 1500 may include a receiver 1405-*a*, a narrowband communication module 140-*b*, or a transmitter 1415-*a*. Wireless device 1500 may also include a processor. Each of these components may be in communication with each other. The narrowband communication module 140-*b* may also include a synchronization signal module 1505, and a synchronization module 1510.

The receiver 1405-*a* may receive information which may be passed on to narrowband communication module 140-*b*, and to other components of wireless device 1500. The narrowband communication module 140-*b* may perform the operations described with reference to FIG. 14. The transmitter 1415-*a* may transmit signals received from other components of wireless device 1500.

The synchronization signal module 1505 may receive a synchronization signal for device discovery, the synchronization signal comprising two or more OFDM symbols within a single resource block transmitted in the narrowband region as described with reference to FIGS. 2-13. In some examples, the synchronization signal comprises one or more of a PSS or a SSS. In some examples, the generating the synchronization signal comprises generating a sequence in a frequency domain or a time domain based at least in part on a number of OFDM symbols in the single resource block.

The synchronization module 1510 may synchronize one or more parameters of transmissions in the narrowband region based at least in part on the synchronization signal as described with reference to FIGS. 2-13. The synchronization module 1510 may also identify one or more synchronization parameters for receiving the narrowband transmissions based at least in part on the indication. In some examples, the identifying the one or more synchronization parameters comprises generating a CRS sequence based at least in part on the a cell identification of a transmitter and a resource block offset value included in the indication.

Figure 16:
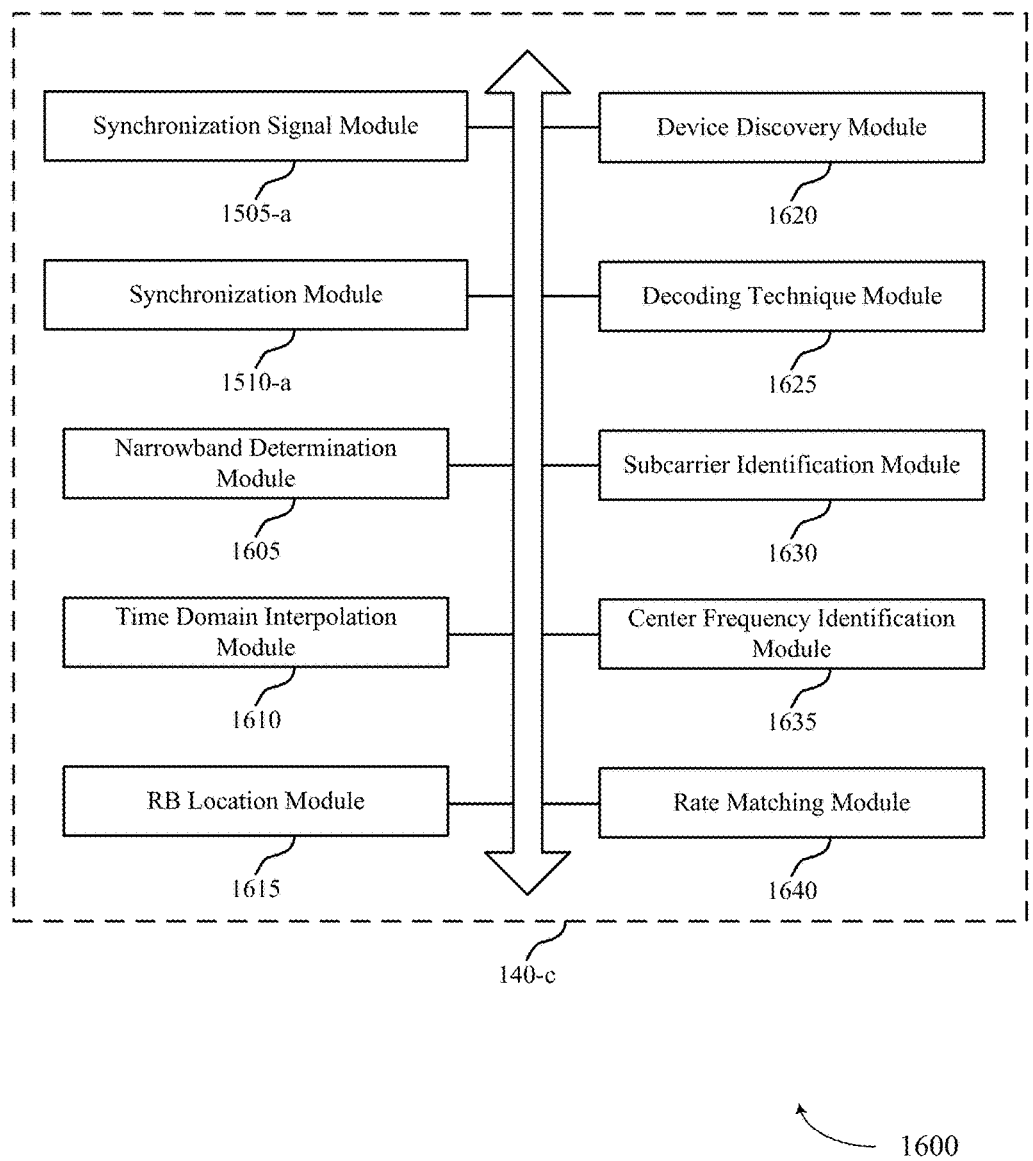

FIG. 16 shows a block diagram 1600 of a narrowband communication module 140-*c* which may be a component of a wireless device 1400 or a wireless device 1500 for downlink and synchronization techniques for narrowband wireless communications in accordance with various aspects of the present disclosure. The narrowband communication module 140-*c* may be an example of aspects of a narrowband communication module 140-*a* described with reference to FIGS. 14-15. The narrowband communication module 140-*c* may include a synchronization signal module 1505-*a*, and a synchronization module 1510-*a*. Each of these modules may perform the functions described with reference to FIG. 15. The narrowband communication module 140-*c* may also include a narrowband determination module 1605, a time domain interpolation module 1610, a RB location module 1615, a device discovery module 1620, a decoding technique module 1625, a subcarrier identification module 1630, a center frequency identification module 1635, and a rate matching module 1640.

The narrowband determination module 1605 may determine whether the narrowband region is within a bandwidth of one or more wideband transmissions based at least in part of a format of the synchronization signal as described with reference to FIGS. 2-13. In some examples, the determining comprises identifying that the narrowband region may be within the bandwidth of one or more wideband transmissions in response to the synchronization signal being formatted in consecutive OFDM symbols within the single resource block. The narrowband determination module 1605 may also identify that the narrowband region is outside of the bandwidth of one or more wideband transmissions in response to the synchronization signal being formatted in one or more non-consecutive OFDM symbols within the single resource block. The narrowband determination module 1605 may also determine, based at least in part on the identified frequency band, whether the narrowband region is within a bandwidth of one or more wideband transmissions. In some examples, the determining whether the narrowband region may be within the bandwidth of one or more wideband transmissions may be based at least in part on a radio access technology associated with the identified frequency band. In some examples, the determining whether the narrowband region may be within the bandwidth of one or more wideband transmissions comprises determining that the narrowband region may be outside of the bandwidth of one or more wideband transmissions in response to the identified frequency band being located in radio spectrum allocated to GSM communications. The narrowband determination module 1605 may also determine that the narrowband region is within the bandwidth of one or more wideband transmissions in response to the identified frequency band being located in radio spectrum allocated to LTE communications.

The time domain interpolation module 1610 may generate an interpolated time domain version of the first sequence based at least in part on a set of samples of the first sequence as described with reference to FIGS. 2-13. In some examples, the generating the synchronization signal further comprises splitting the interpolated time domain version into a plurality of parts each having a duration of one OFDM symbol. The time domain interpolation module 1610 may also identify a subset of samples for each part that correspond to a cyclic prefix associated with the associated OFDM symbol. The time domain interpolation module 1610 may also remove the identified subset of samples for each part. The time domain interpolation module 1610 may also insert a cyclic prefix into each part. In some examples, generating the synchronization signal further comprises windowing each OFDM symbol in the frequency domain such that only a subset of OFDM subcarriers carry the synchronization sequence.

The RB location module 1615 may receive an indication of a location of a single resource block for narrowband transmissions, the single resource block within the wideband region of the system bandwidth as described with reference to FIGS. 2-13. In some examples, the indication comprises a total wideband bandwidth of the system bandwidth and a resource block index that indicates a location of the single resource block. In some examples, the indication may be transmitted in one or more of a MIB or a SIB.

The device discovery module 1620 may identify a frequency band of the narrowband region of the system bandwidth for transmission of a PBCH that includes system information for device discovery as described with reference to FIGS. 2-13.

The decoding technique module 1625 may select a decoding technique for decoding the PBCH based at least in part on the identified frequency band of the narrowband region as described with reference to FIGS. 2-13. In some examples, selecting the decoding technique for decoding the PBCH comprises selecting a CRS based decoding technique in response to determining that the narrowband region may be outside of the bandwidth of one or more wideband transmissions. The decoding technique module 1625 may also select a DMRS based decoding technique in response to determining that the narrowband region is within the bandwidth of one or more wideband transmissions.

The subcarrier identification module 1630 may identify a plurality of subcarriers within the narrowband region of the system bandwidth used to transmit a resource block as described with reference to FIGS. 2-13. The subcarrier identification module 1630 may also modify one or more other subcarriers of the plurality of subcarriers based at least in part on the identification of the center-frequency subcarrier. In some examples, the modifying one or more other subcarriers comprises receiving an indication that the center-frequency subcarrier may be to be unused for data transmissions. In some examples, the modifying one or more other subcarriers further comprises power boosting one or more of the plurality of subcarriers other than the center-frequency subcarrier. In some examples, the modifying one or more other subcarriers comprises applying a frequency shift to one or more of the plurality of subcarriers other than the center-frequency subcarrier. In some examples, the modifying one or more other subcarriers comprises generating a digital waveform with an offset corresponding to a frequency shift of one-half of a subcarrier frequency bandwidth. The subcarrier identification module 1630 may also adjust a transmit oscillator based at least in part on the offset of the digital waveform.

The center frequency identification module 1635 may identify a center-frequency subcarrier of the plurality of subcarriers used to transmit the resource block as described with reference to FIGS. 2-13. The rate matching module 1640 may rate match data transmissions around the center-frequency subcarrier as described with reference to FIGS. 2-13.

Figure 17:
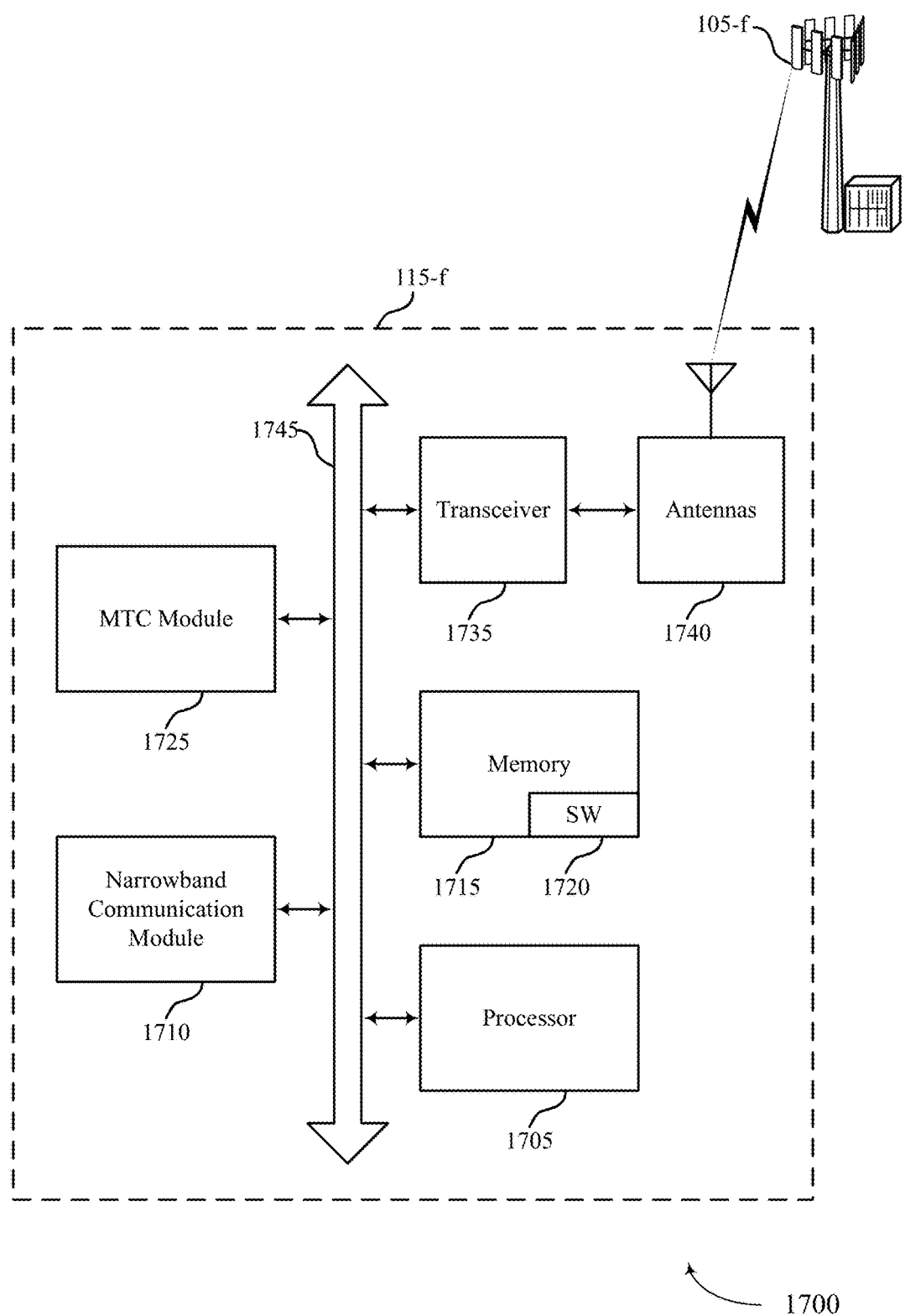
FIG. 17 illustrates a block diagram of a system including a UE that supports downlink and synchronization techniques for narrowband wireless communications in accordance with various aspects of the present disclosure.

FIG. 17 shows a diagram of a system 1700 including a UE 115 configured for downlink and synchronization techniques for narrowband wireless communications in accordance with various aspects of the present disclosure. System 1700 may include UE 115-$f$, which may be an example of a wireless device 1400, a wireless device 1500, or a UE 115 described with reference to FIGS. 1, 2 and 10-16. UE 115-$f$ may include a narrowband communication module 1710, which may be an example of a narrowband communication module 140 described with reference to FIGS. 1 and 14-16. UE 115-$f$ may also include a MTC module 1725 that may manage MTC communications. UE 115-$f$ may also include components for bi-directional voice and data communications including components for transmitting communications and components for receiving communications. For example, UE 115-$f$ may communicate bi-directionally with base station 105-$f$.

UE 115-$f$ may also include a processor 1705, and memory 1715 (including software (SW)) 1720, a transceiver 1735, and one or more antenna(s) 1740, each of which may communicate, directly or indirectly, with one another (e.g., via buses 1745). The transceiver 1735 may communicate bi-directionally, via the antenna(s) 1740 or wired or wireless links, with one or more networks, as described above. For example, the transceiver 1735 may communicate bi-directionally with a base station 105 or another UE 115. The transceiver 1735 may include a modem to modulate the packets and provide the modulated packets to the antenna(s) 1740 for transmission, and to demodulate packets received from the antenna(s) 1740. While UE 115-$f$ may include a single antenna 1740, UE 115-$f$ may also have multiple antennas 1740 capable of concurrently transmitting or receiving multiple wireless transmissions.

The memory 1715 may include random access memory (RAM) and read only memory (ROM). The memory 1715 may store computer-readable, computer-executable software/firmware code 1720 including instructions that, when executed, cause the processor 1705 to perform various functions described herein (e.g., downlink and synchronization techniques for narrowband wireless communications, etc.). Alternatively, the software/firmware code 1720 may not be directly executable by the processor 1705 but cause a computer (e.g., when compiled and executed) to perform functions described herein. The processor 1705 may include an intelligent hardware device, (e.g., a central processing unit (CPU), a microcontroller, an application specific integrated circuit (ASIC), etc.)

Figure 18:
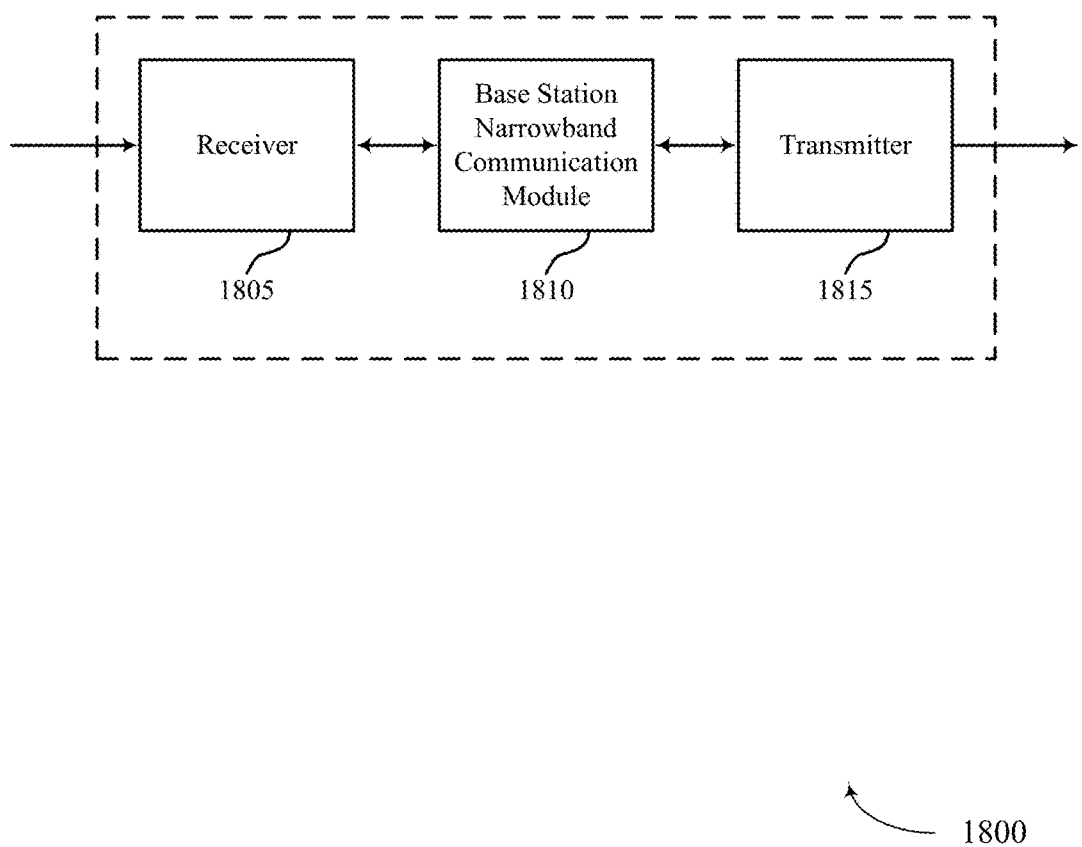
FIGS. 18-20 show block diagrams of a wireless device that supports downlink and synchronization techniques for narrowband wireless communications in accordance with various aspects of the present disclosure.

FIG. 18 shows a block diagram of a wireless device 1800 configured for downlink and synchronization techniques for narrowband wireless communications in accordance with various aspects of the present disclosure. Wireless device 1800 may be an example of aspects of a base station 105 described with reference to FIGS. 1-17. Wireless device 1800 may include a receiver 1805, a base station narrowband communication module 145-$a$, or a transmitter 1815. The base station narrowband communication module 145-$a$ may be an example of a base station narrowband communication module 145 described with reference to FIG. 1. Wireless device 1800 may also include a processor. Each of these components may be in communication with each other.

The receiver 1805 may receive information such as packets, user data, or control information associated with various information channels (e.g., control channels, data channels, and information related to downlink and synchronization techniques for narrowband wireless communications, etc.). Information may be passed on to the base station narrowband communication module 145-$a$, and to other components of wireless device 1800.

The base station narrowband communication module 145-$a$ may generate a synchronization signal for device discovery, the synchronization signal comprising two or more OFDM symbols within a single resource block, and transmit the synchronization signal in the narrowband region.

The transmitter 1815 may transmit signals received from other components of wireless device 1800. In some examples, the transmitter 1815 may be collocated with the receiver 1805 in a transceiver module. The transmitter 1815 may include a single antenna, or it may include a plurality of antennas.

Figure 19:
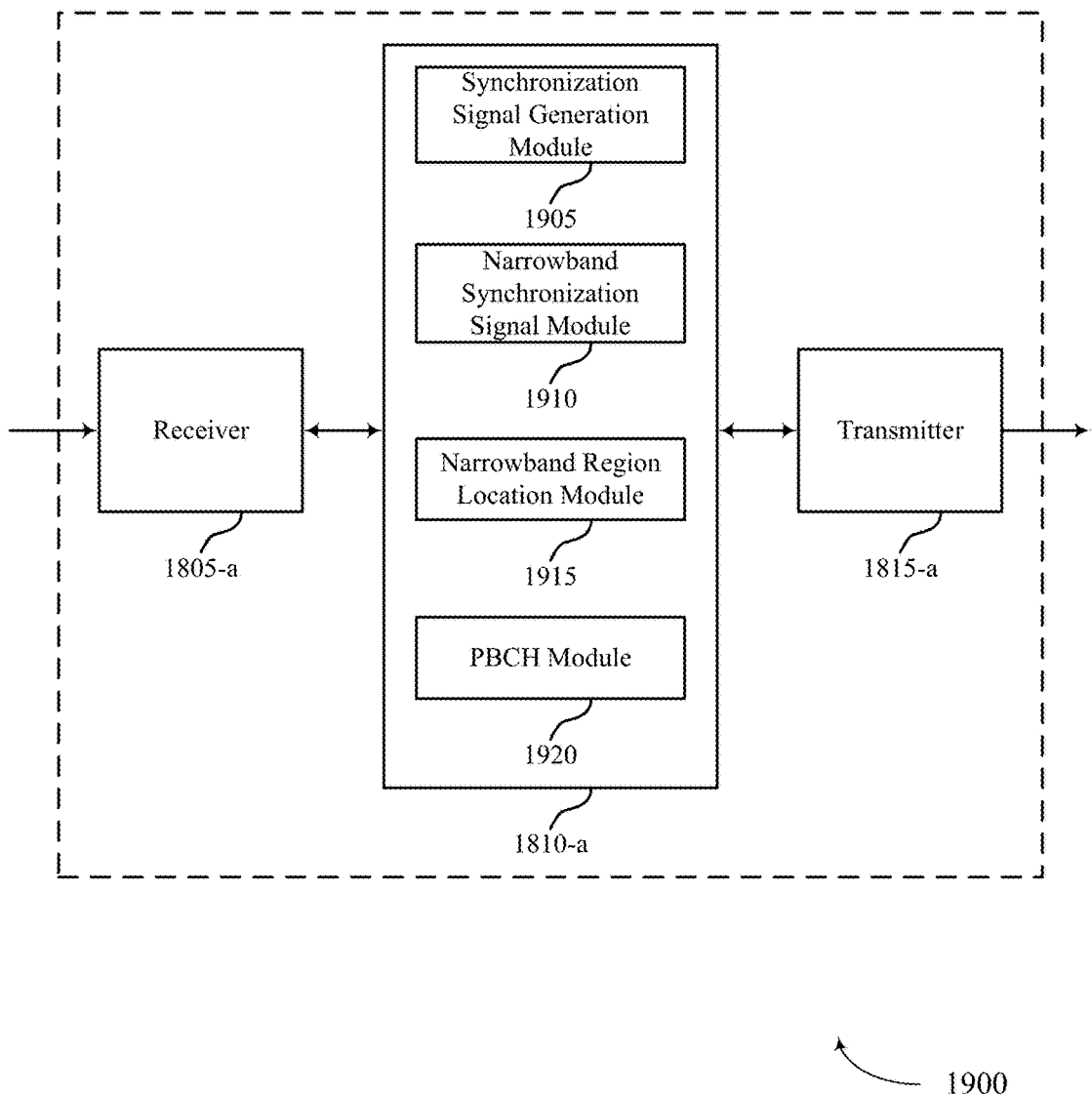

FIG. 19 shows a block diagram of a wireless device 1900 for downlink and synchronization techniques for narrowband wireless communications in accordance with various aspects of the present disclosure. Wireless device 1900 may be an example of aspects of a wireless device 1800 or a base station 105 described with reference to FIGS. 1-18. Wireless device 1900 may include a receiver 1805-*a*, a base station narrowband communication module 145-*b*, or a transmitter 1815-*a*. Wireless device 1900 may also include a processor. Each of these components may be in communication with each other. The base station narrowband communication module 145-*b* may also include a synchronization signal generation module 1905, a narrowband synchronization signal module 1910, a narrowband region location module 1915, and a PBCH module 1920.

The receiver 1805-*a* may receive information which may be passed on to base station narrowband communication module 145-*b*, and to other components of wireless device 1900. The base station narrowband communication module 145-*b* may perform the operations described with reference to FIG. 18. The transmitter 1815-*a* may transmit signals received from other components of wireless device 1900.

The synchronization signal generation module 1905 may generate a synchronization signal for device discovery, the synchronization signal comprising two or more OFDM symbols within a single resource block as described with reference to FIGS. 2-13. In some examples, the synchronization signal comprises one or more of a PSS or a SSS.

The narrowband synchronization signal module 1910 may transmit the synchronization signal in the narrowband region as described with reference to FIGS. 2-13. In some examples, the synchronization signal may be transmitted in a set of contiguous OFDM symbols. In some examples, the transmission of the synchronization signal in the narrowband region comprises transmitting the synchronization signal in a subframe previously configured as an MBSFN subframe. The narrowband synchronization signal module 1910 may also identify whether the narrowband region is within a bandwidth of one or more wideband transmissions. The narrowband synchronization signal module 1910 may also transmit the synchronization signal using the selected OFDM symbols.

The narrowband region location module 1915 may identify a location of the narrowband region of the system bandwidth as a single resource block within a wideband region of the system bandwidth as described with reference to FIGS. 2-13.

The PBCH module 1920 may generate a PBCH signal for transmission of system information for device discovery in the narrowband region as described with reference to FIGS. 2-13. The PBCH module 1920 may also modulate the PBCH signal based at least in part on a DMRS. The PBCH module 1920 may also transmit the modulated PBCH signal in the narrowband region. The PBCH module 1920 may also generate a PBCH signal for transmission of system information for device discovery, the PBCH signal included in a resource block to be transmitted in the narrowband region. The PBCH module 1920 may also transmit the PBCH signal in the MBSFN subframe.

Figure 20:
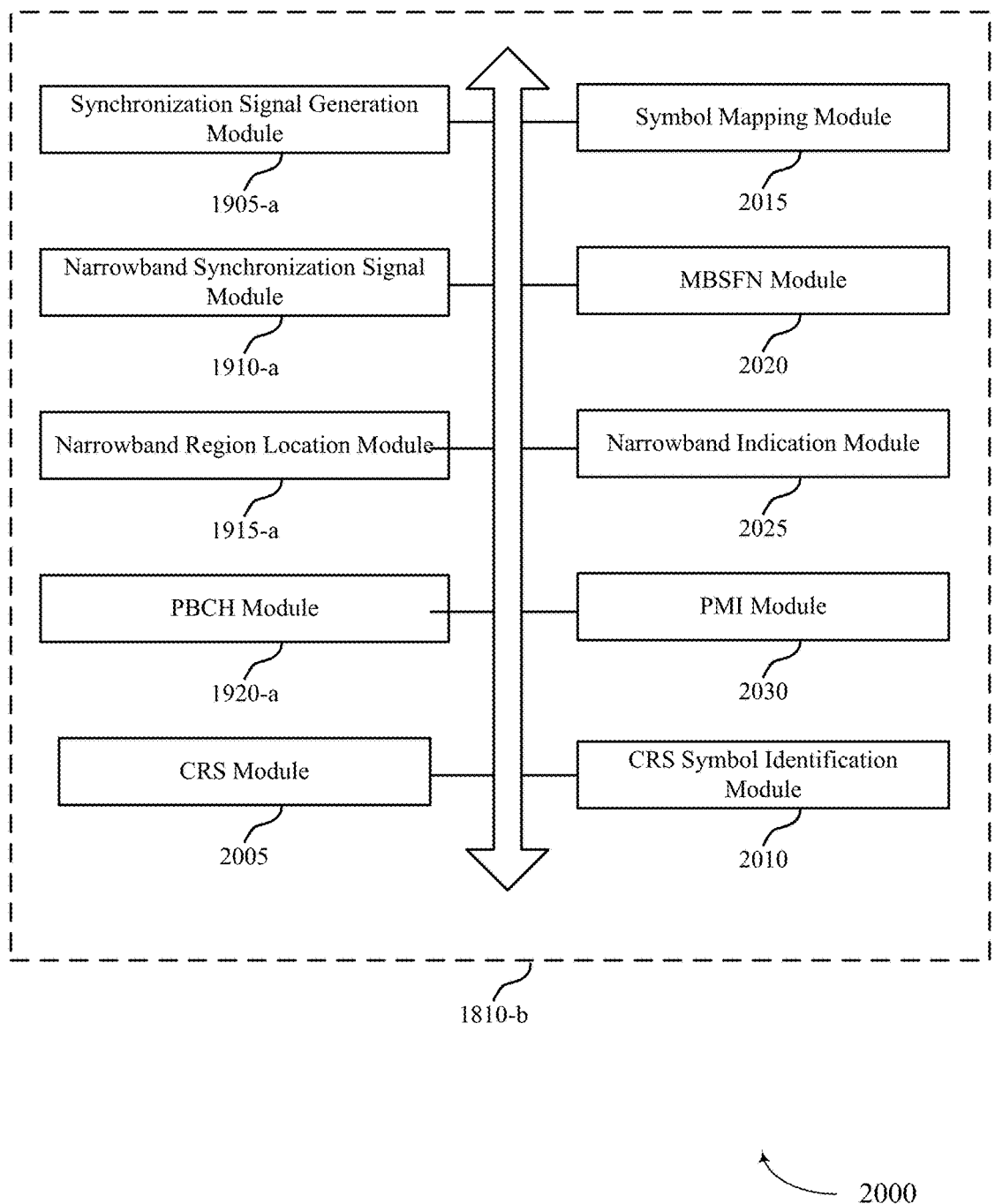

FIG. 20 shows a block diagram 2000 of a base station narrowband communication module 145-*c* which may be a component of a wireless device 1800 or a wireless device 1900 for downlink and synchronization techniques for narrowband wireless communications in accordance with various aspects of the present disclosure. The base station narrowband communication module 145-*c* may be an example of aspects of a base station narrowband communication module 145-*a* described with reference to FIGS. 18-19. The base station narrowband communication module 145-*c* may include a synchronization signal generation module 1905-*a*, a narrowband synchronization signal module 1910-*a*, a narrowband region location module 1915-*a*, and a PBCH module 1920-*a*. Each of these modules may perform the functions described with reference to FIG. 19. The base station narrowband communication module 145-*c* may also include a CRS module 2005, a CRS symbol identification module 2010, a symbol mapping module 2015, a MBSFN module 2020, a narrowband indication module 2025, and a PMI module 2030.

The CRS module 2005 may transmit a CRS using one or more REs that puncture the set of contiguous OFDM symbols as described with reference to FIGS. 2-13. The CRS module 2005, in some examples, may transmit a CRS in one or more of the modulated PBCH signal or the other transmissions in the narrowband region of the system bandwidth, the CRS for use in channel estimation be one or more receivers as described with reference to FIGS. 2-13. The base station CRS module 2005 may also transmit a CRS in the resource block. In some examples, the CRS may be generated assuming a resource block offset of zero. In some examples, the CRS may be transmitted in one or more OFDM symbols within the resource block, and wherein the one or more OFDM symbols have a fixed offset within the resource block.

The CRS symbol identification module 2010 may identify one or more OFDM symbols within the single resource block as CRS OFDM symbols that include one or more CRS REs as described with reference to FIGS. 2-13. The symbol mapping module 2015 may map the OFDM symbols that contain the synchronization signal to non-CRS OFDM symbols as described with reference to FIGS. 2-13. The MBSFN module 2020 may configure a subframe that includes the synchronization signal as an MBSFN subframe as described with reference to FIGS. 2-13. The MBSFN module 2020 may also identify a subframe that includes the resource block as a MBSFN subframe.

The narrowband indication module 2025 may indicate to one or more receivers whether the narrowband region is within the bandwidth of one or more wideband transmissions as described with reference to FIGS. 2-13. In some examples, the indicating to one or more receivers whether the narrowband region may be within the bandwidth of one or more wideband transmissions comprises selecting OFDM symbols within the single resource block for transmission of the based at least in part on whether the narrowband region may be within the bandwidth of one or more wideband transmissions. The narrowband indication module 2025 may also transmit an indication of the location of the single resource block within the wideband region of the system bandwidth. In some examples, the indication comprises a total wideband bandwidth of the system bandwidth and a resource block index that indicates a location of the single resource block. In some examples, the indication comprises a resource block offset from start of a wideband bandwidth of the system bandwidth. In some examples, the indication comprises one or more CRS REs included in the single resource block. In some examples, the indication may be transmitted in one or more of a MIB or a SIB.

The PMI module 2030 may be configured such that the modulating the PBCH signal may include selecting a precoding matrix for transmission of the modulated PBCH signal as described with reference to FIGS. 2-13. The PMI module 2030 may also use the selected precoding matrix for other transmissions in the narrowband region on the system bandwidth.

Figure 21:
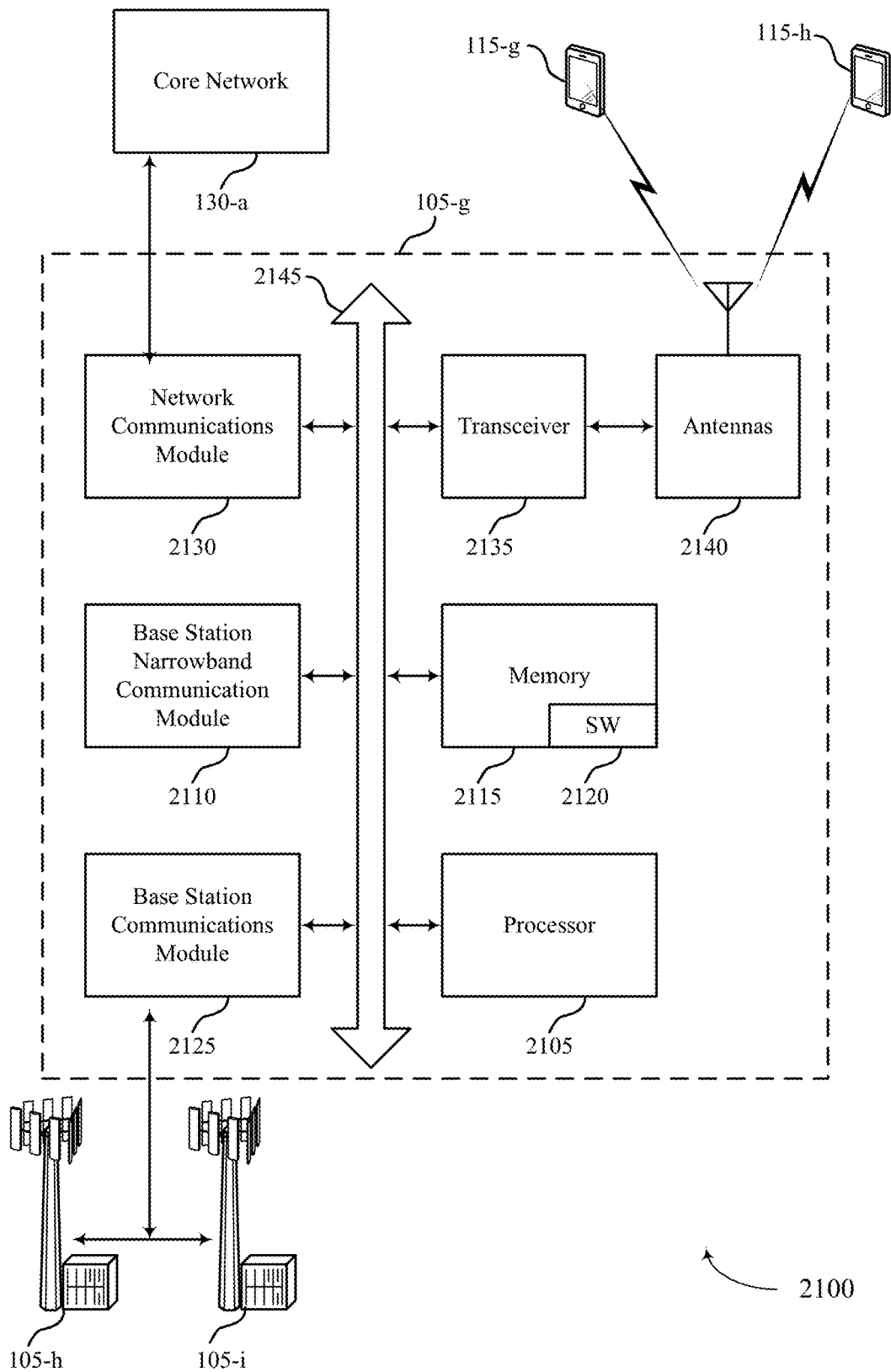
FIG. 21 illustrates a block diagram of a system including a base station that supports downlink and synchronization techniques for narrowband wireless communications in accordance with various aspects of the present disclosure.

FIG. 21 shows a diagram of a system 2100 including a base station 105 configured for downlink and synchronization techniques for narrowband wireless communications in accordance with various aspects of the present disclosure. System 2100 may include base station 105-*g*, which may be an example of a wireless device 1800, a wireless device 1900, or a base station 105 described with reference to FIGS. 1, 2 and 18-20. Base Station 105-*g* may include a base station narrowband communication module 2110, which may be an example of a base station narrowband communication module 145-*a* described with reference to FIGS. 18-20. Base Station 105-*g* may also include components for bi-directional voice and data communications including components for transmitting communications and components for receiving communications. For example, base station 105-*g* may communicate bi-directionally with UE 115-*g* or UE 115-*h*.

In some cases, the base station 105-*g* may have one or more wired backhaul links. The base station 105-*g* may have a wired backhaul link (e.g., S1 interface, etc.) to the core network 130. The base station 105-*g* may also communicate with other base stations 105, such as the base station 105-*h* and the base station 105-*i* via inter-base station backhaul links (e.g., an X2 interface). Each of the base stations 105 may communicate with UEs 115 using the same or different wireless communications technologies. In some cases, the base station 105-*g* may communicate with other base stations such as 105-*h* or 105-*i* utilizing the base station communication module 2125. In some examples, the base station communication module 2125 may provide an X2 interface within an LTE/LTE-A wireless communication network technology to provide communication between some of the base stations 105. In some examples, the base station 105-*g* may communicate with other base stations through the core network 130. In some cases, the base station 105-*g* may communicate with the core network 130 through the network communications module 2130.

The base station 105-*g* may include a processor 2105, memory 2115 (including software (SW)2120), a transceiver 2135, and antenna(s) 2140, which each may be in communication, directly or indirectly, with one another (e.g., over the bus system 2145). The transceivers 2135 may be configured to communicate bi-directionally, via the antenna(s) 2140, with the UEs 115, which may be multi-mode devices. The transceiver 2135 (or other components of the base station 105-*g*) may also be configured to communicate bi-directionally, via the antennas 2140, with one or more other base stations. The transceiver 2135 may include a modem configured to modulate the packets and provide the modulated packets to the antennas 2140 for transmission, and to demodulate packets received from the antennas 2140. The base station 105-*g* may include multiple transceivers 2135, each with one or more associated antennas 2140. The transceiver may be an example of a combined receiver 1805 and transmitter 1815 of FIG. 18.

The memory 2115 may include RAM and ROM. The memory 2115 may also store computer-readable, computer-executable software code 2120 containing instructions that are configured to, when executed, cause the processor 2110 to perform various functions described herein (e.g., downlink and synchronization techniques for narrowband wireless communications, selecting coverage enhancement techniques, call processing, database management, message routing, etc.). Alternatively, the software 2120 may not be directly executable by the processor 2105 but be configured to cause the computer, e.g., when compiled and executed, to perform functions described herein. The processor 2105 may include an intelligent hardware device, e.g., a CPU, a microcontroller, an ASIC, etc. The processor 2105 may include various special purpose processors such as encoders, queue processing modules, base band processors, radio head controllers, digital signal processor (DSPs), and the like.

The base station communications module 2125 may manage communications with other base stations 105. In some cases, a communications management module may include a controller or scheduler for controlling communications with UEs 115 in cooperation with other base stations 105. For example, the base station communications module 2125 may coordinate scheduling for transmissions to UEs 115 for various interference mitigation techniques such as beamforming or joint transmission.

The components of the wireless device 1400, the wireless device 1500, and the narrowband communication module 140-*a* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 22:
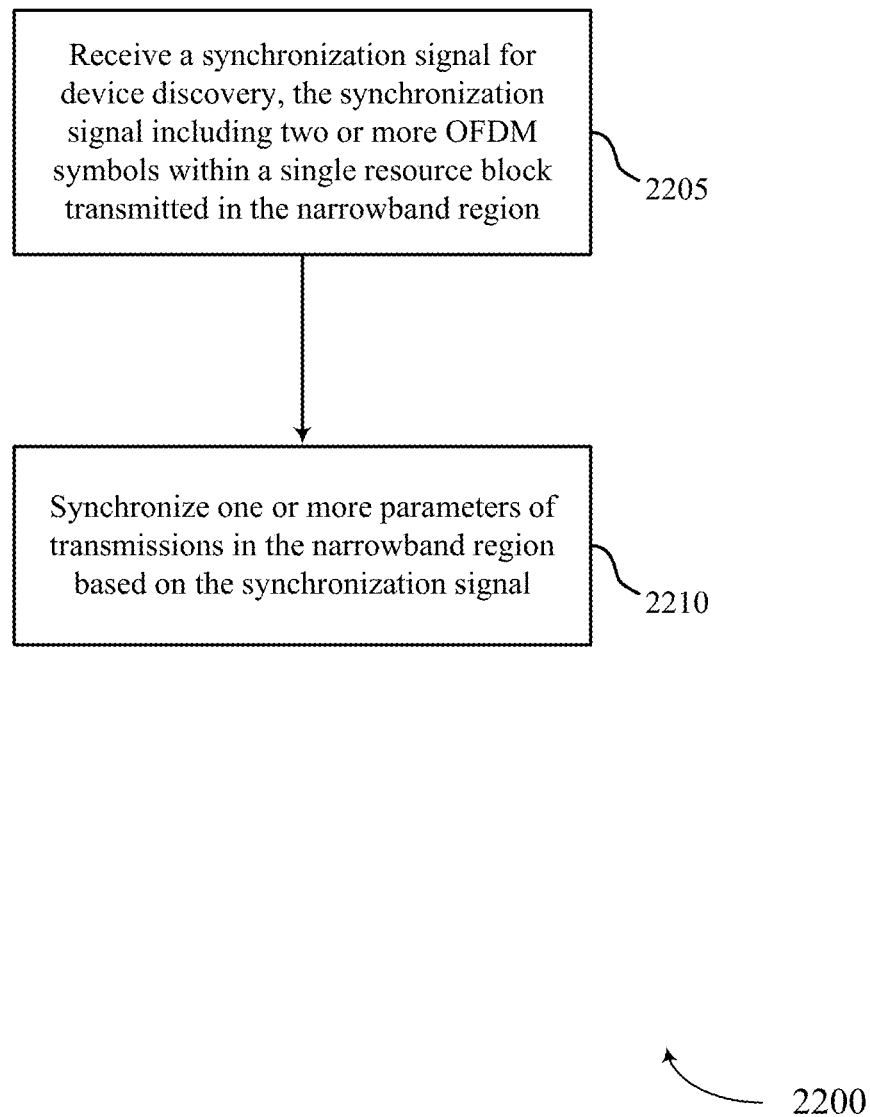
FIGS. 22-29 illustrate methods for downlink and synchronization techniques for narrowband wireless communications in accordance with various aspects of the present disclosure.

FIG. 22 shows a flowchart illustrating a method 2200 for downlink and synchronization techniques for narrowband wireless communications in accordance with various aspects of the present disclosure. The operations of method 2200 may be implemented by a UE 115 or its components as described with reference to FIGS. 1-21. For example, the operations of method 2200 may be performed by the narrowband communication module 140 as described with reference to FIGS. 1 and 14-17. In some examples, a UE 115 may execute a set of codes to control the functional elements of the UE 115 to perform the functions described below. Additionally or alternatively, the UE 115 may perform aspects of the functions described below using special-purpose hardware.

At block 2205, the UE 115 may receive a synchronization signal for device discovery, the synchronization signal comprising two or more OFDM symbols within a single resource block transmitted in the narrowband region as described with reference to FIGS. 2-13. In certain examples, the operations of block 2205 may be performed by the synchronization signal module 1505 as described with reference to FIG. 15.

At block 2210, the UE 115 may synchronize one or more parameters of transmissions in the narrowband region based at least in part on the synchronization signal as described with reference to FIGS. 2-13. In certain examples, the operations of block 2210 may be performed by the synchronization module 1510 as described with reference to FIG. 15.

Figure 23:
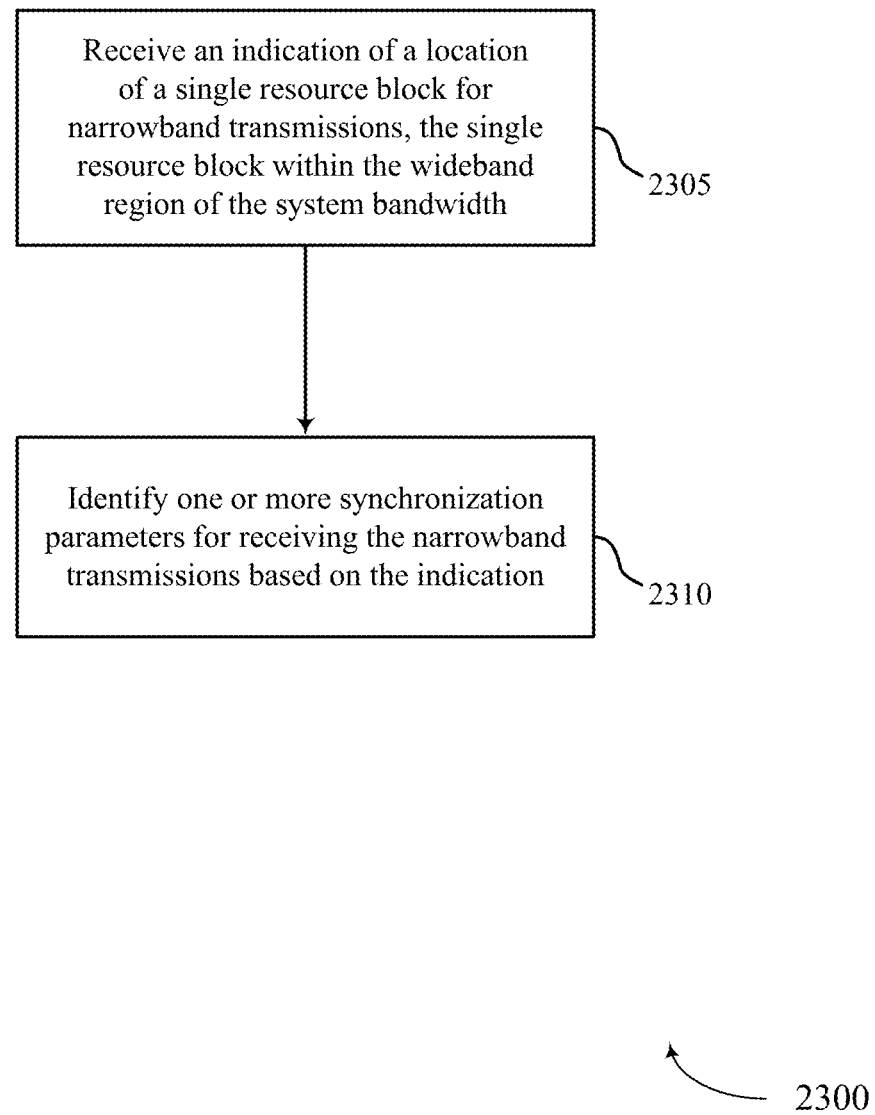

FIG. 23 shows a flowchart illustrating a method 2300 for downlink and synchronization techniques for narrowband wireless communications in accordance with various aspects of the present disclosure. The operations of method 2300 may be implemented by a UE 115 or its components as described with reference to FIGS. 1-21. For example, the operations of method 2300 may be performed by the narrowband communication module 140 as described with reference to FIGS. 1 and 14-17. In some examples, a UE 115 may execute a set of codes to control the functional elements of the UE 115 to perform the functions described below. Additionally or alternatively, the UE 115 may perform aspects of the functions described below using special-purpose hardware. The method 2300 may also incorporate aspects of method 2200 of FIG. 22.

At block 2305, the UE 115 may receive an indication of a location of a single resource block for narrowband transmissions, the single resource block within the wideband region of the system bandwidth as described with reference to FIGS. 2-13. In certain examples, the operations of block 2305 may be performed by the RB location module 1615 as described with reference to FIG. 16.

At block 2310, the UE 115 may identify one or more synchronization parameters for receiving the narrowband transmissions based at least in part on the indication as described with reference to FIGS. 2-13. In certain examples, the operations of block 2310 may be performed by the synchronization module 1510 as described with reference to FIG. 15.

Figure 24:
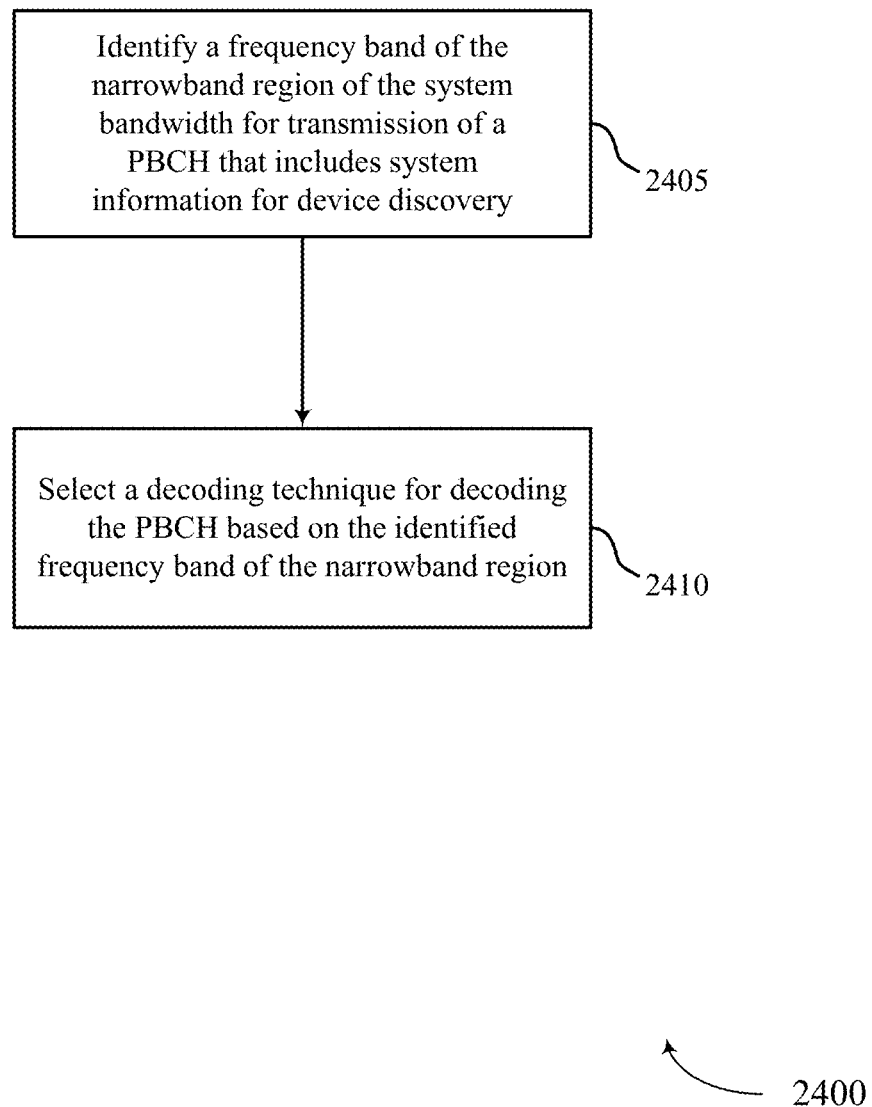

FIG. 24 shows a flowchart illustrating a method 2400 for downlink and synchronization techniques for narrowband wireless communications in accordance with various aspects of the present disclosure. The operations of method 2400 may be implemented by a UE 115 or its components as described with reference to FIGS. 1-21. For example, the operations of method 2400 may be performed by the narrowband communication module 140 as described with reference to FIGS. 1 and 14-17. In some examples, a UE 115 may execute a set of codes to control the functional elements of the UE 115 to perform the functions described below. Additionally or alternatively, the UE 115 may perform aspects of the functions described below using special-purpose hardware. The method 2400 may also incorporate aspects of methods 2200, and 2300 of FIGS. 22-23.

At block 2405, the UE 115 may identify a frequency band of the narrowband region of the system bandwidth for transmission of a PBCH that includes system information for device discovery as described with reference to FIGS. 2-13. In certain examples, the operations of block 2405 may be performed by the device discovery module 1620 as described with reference to FIG. 16.

At block 2410, the UE 115 may select a decoding technique for decoding the PBCH based at least in part on the identified frequency band of the narrowband region as described with reference to FIGS. 2-13. In certain examples, the operations of block 2410 may be performed by the decoding technique module 1625 as described with reference to FIG. 16.

Figure 25:
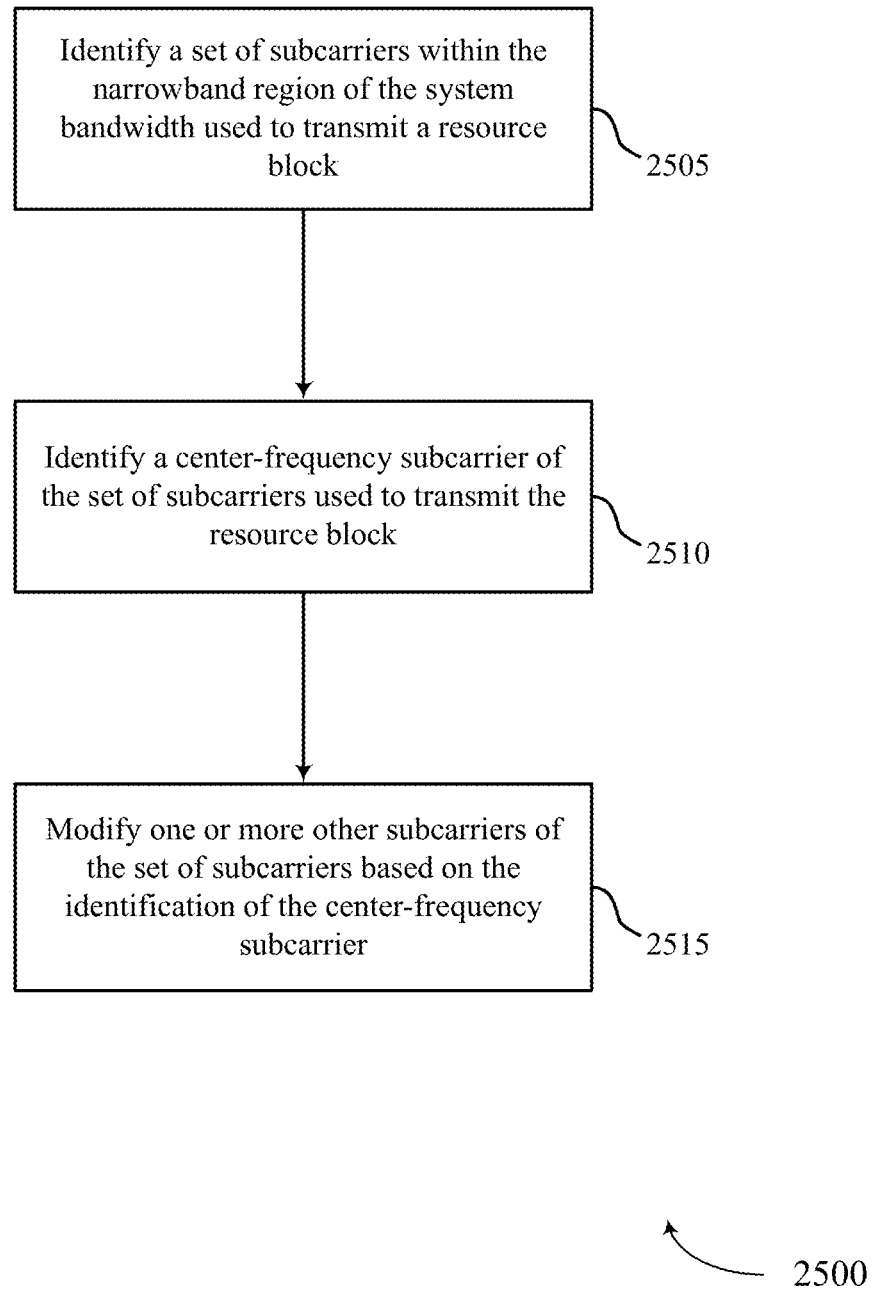

FIG. 25 shows a flowchart illustrating a method 2500 for downlink and synchronization techniques for narrowband wireless communications in accordance with various aspects of the present disclosure. The operations of method 2500 may be implemented by a UE 115 or its components as described with reference to FIGS. 1-21. For example, the operations of method 2500 may be performed by the narrowband communication module 140 as described with reference to FIGS. 1 and 14-17. In some examples, a UE 115 may execute a set of codes to control the functional elements of the UE 115 to perform the functions described below. Additionally or alternatively, the UE 115 may perform aspects of the functions described below using special-purpose hardware. The method 2500 may also incorporate aspects of methods 2200, 2300, and 2400 of FIGS. 22-24.

At block 2505, the UE 115 may identify a plurality of subcarriers within the narrowband region of the system bandwidth used to transmit a resource block as described with reference to FIGS. 2-13. In certain examples, the operations of block 2505 may be performed by the subcarrier identification module 1630 as described with reference to FIG. 16.

At block 2510, the UE 115 may identify a center-frequency subcarrier of the plurality of subcarriers used to transmit the resource block as described with reference to FIGS. 2-13. In certain examples, the operations of block 2510 may be performed by the center frequency identification module 1635 as described with reference to FIG. 16.

At block 2515, the UE 115 may modify one or more other subcarriers of the plurality of subcarriers based at least in part on the identification of the center-frequency subcarrier as described with reference to FIGS. 2-13. In certain examples, the operations of block 2515 may be performed by the subcarrier identification module 1630 as described with reference to FIG. 16.

Figure 26:
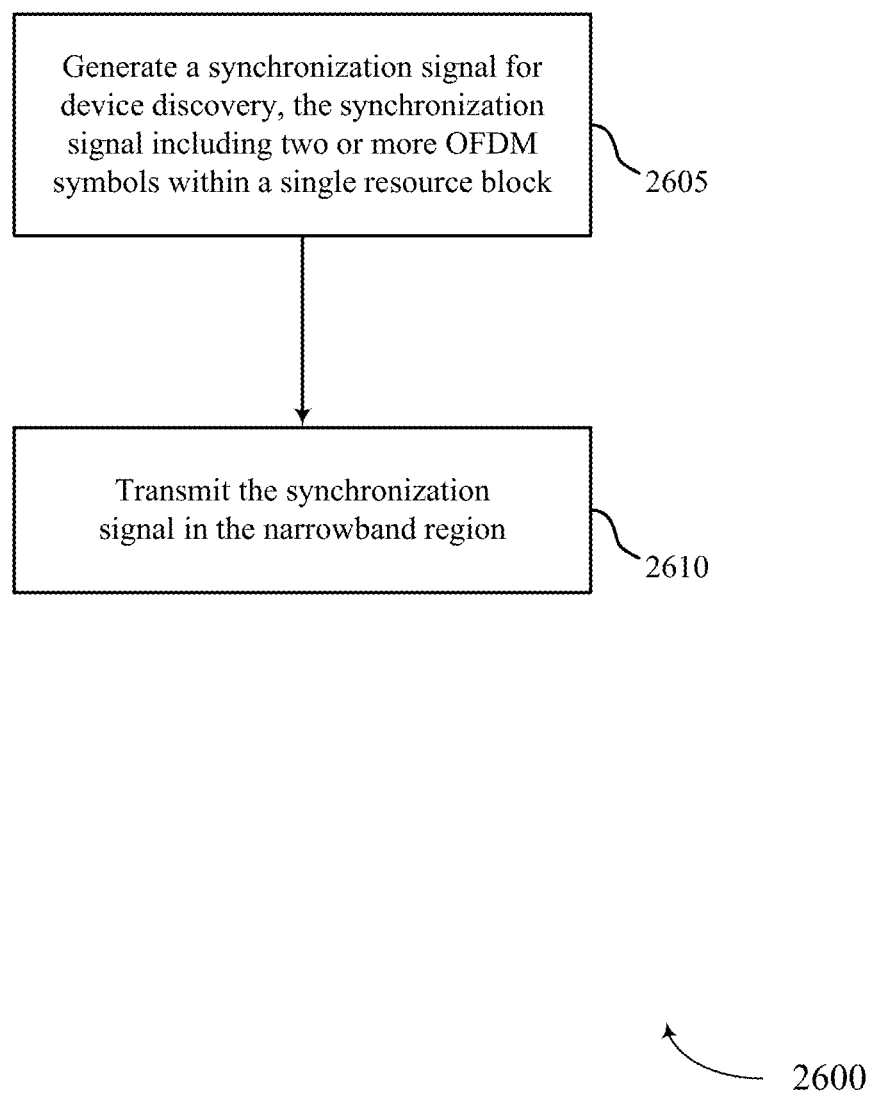

FIG. 26 shows a flowchart illustrating a method 2600 for downlink and synchronization techniques for narrowband wireless communications in accordance with various aspects of the present disclosure. The operations of method 2600 may be implemented by a base station 105 or its components as described with reference to FIGS. 1-21. For example, the operations of method 2600 may be performed by the base station narrowband communication module 145 as described with reference to FIGS. 1 and 18-21. In some examples, a base station 105 may execute a set of codes to control the functional elements of the base station 105 to perform the functions described below. Additionally or alternatively, the base station 105 may perform aspects of the functions described below using special-purpose hardware. The method 2600 may also incorporate aspects of methods 2200, 2300, 2400, and 2500 of FIGS. 22-25.

At block 2605, the base station 105 may generate a synchronization signal for device discovery, the synchronization signal comprising two or more OFDM symbols within a single resource block as described with reference to FIGS. 2-13. In certain examples, the operations of block 2605 may be performed by the synchronization signal generation module 1905 as described with reference to FIG. 19.

At block 2610, the base station 105 may transmit the synchronization signal in the narrowband region as described with reference to FIGS. 2-13. In certain examples, the operations of block 2610 may be performed by the narrowband synchronization signal module 1910 as described with reference to FIG. 19.

Figure 27:
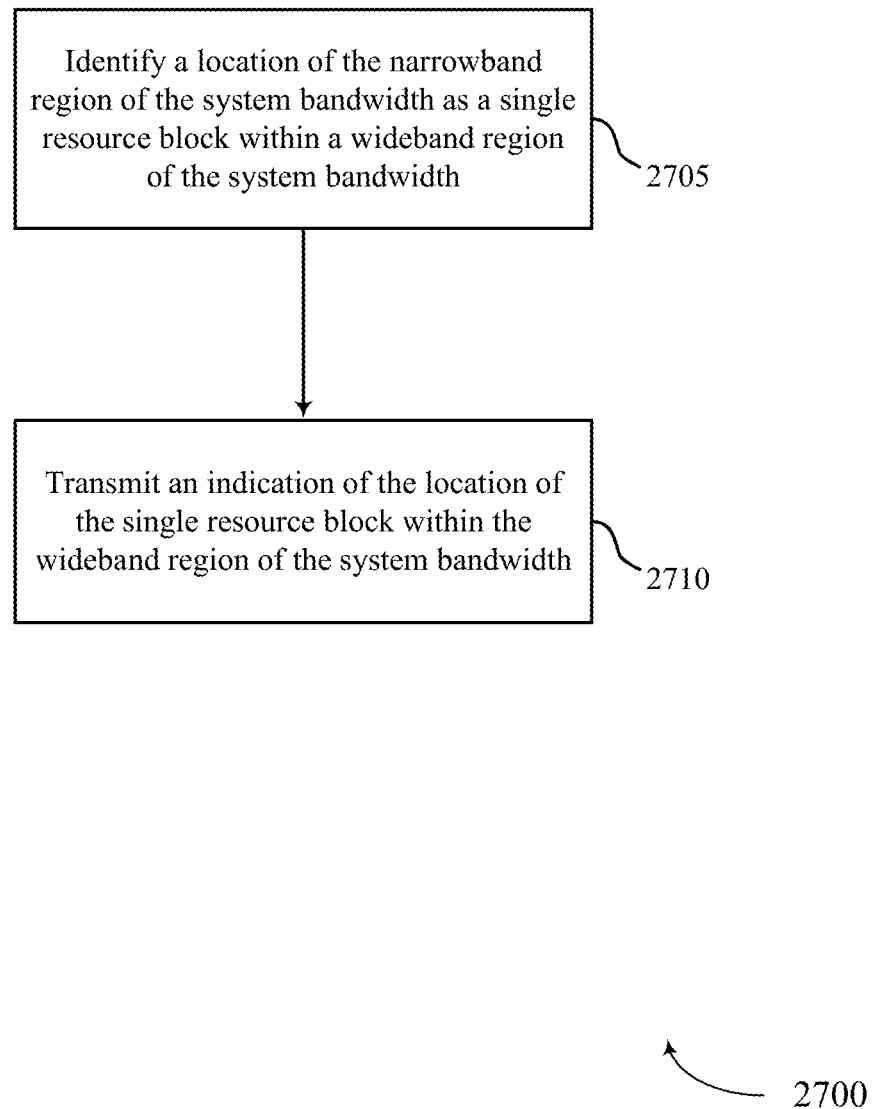

FIG. 27 shows a flowchart illustrating a method 2700 for downlink and synchronization techniques for narrowband wireless communications in accordance with various aspects of the present disclosure. The operations of method 2700 may be implemented by a base station 105 or its components as described with reference to FIGS. 1-21. For example, the operations of method 2700 may be performed by the base station narrowband communication module 145 as described with reference to FIGS. 1 and 18-21. In some examples, a base station 105 may execute a set of codes to control the functional elements of the base station 105 to perform the functions described below. Additionally or alternatively, the base station 105 may perform aspects of the functions described below using special-purpose hardware. The method 2700 may also incorporate aspects of methods 2200, 2300, 2400, 2500, and 2600 of FIGS. 22-26.

At block 2705, the base station 105 may identify a location of the narrowband region of the system bandwidth as a single resource block within a wideband region of the system bandwidth as described with reference to FIGS. 2-13. In certain examples, the operations of block 2705 may be performed by the narrowband region location module 1915 as described with reference to FIG. 19.

At block 2710, the base station 105 may transmit an indication of the location of the single resource block within the wideband region of the system bandwidth as described with reference to FIGS. 2-13. In certain examples, the operations of block 2710 may be performed by the narrowband indication module 2025 as described with reference to FIG. 20.

Figure 28:
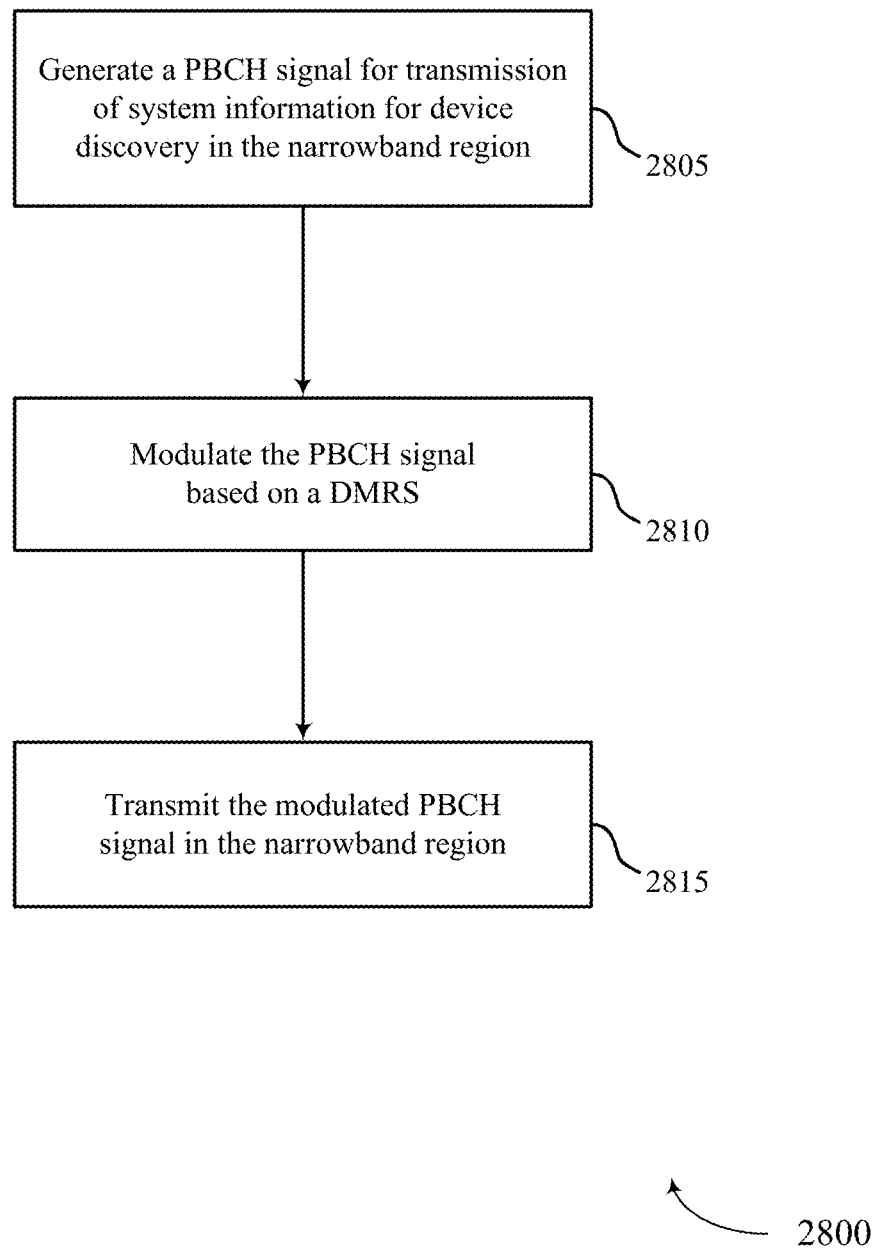

FIG. 28 shows a flowchart illustrating a method 2800 for downlink and synchronization techniques for narrowband wireless communications in accordance with various aspects of the present disclosure. The operations of method 2800 may be implemented by a base station 105 or its components as described with reference to FIGS. 1-21. For example, the operations of method 2800 may be performed by the base station narrowband communication module 145 as described with reference to FIGS. 1 and 18-21. In some examples, a base station 105 may execute a set of codes to control the functional elements of the base station 105 to perform the functions described below. Additionally or alternatively, the base station 105 may perform aspects of the functions described below using special-purpose hardware. The method 2800 may also incorporate aspects of methods 2200, 2300, 2400, 2500, 2600, and 2700 of FIGS. 22-27.

At block 2805, the base station 105 may generate a PBCH signal for transmission of system information for device discovery in the narrowband region as described with reference to FIGS. 2-13. In certain examples, the operations of block 2805 may be performed by the PBCH module 1920 as described with reference to FIG. 19.

At block 2810, the base station 105 may modulate the PBCH signal based at least in part on a DMRS as described with reference to FIGS. 2-13. In certain examples, the operations of block 2810 may be performed by the PBCH module 1920 as described with reference to FIG. 19.

At block 2815, the base station 105 may transmit the modulated PBCH signal in the narrowband region as described with reference to FIGS. 2-13. In certain examples, the operations of block 2815 may be performed by the PBCH module 1920 as described with reference to FIG. 19.

Figure 29:
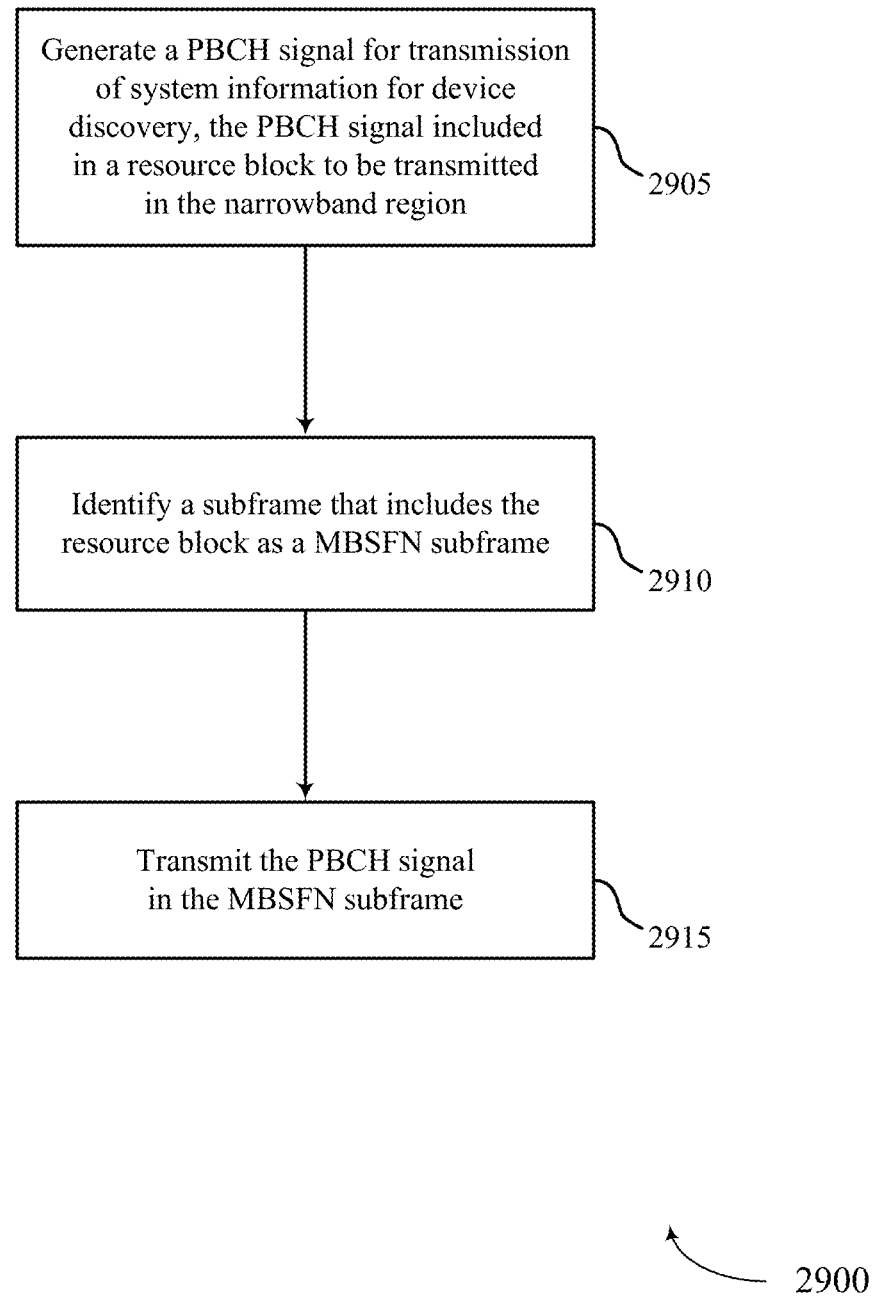

FIG. 29 shows a flowchart illustrating a method 2900 for downlink and synchronization techniques for narrowband wireless communications in accordance with various aspects of the present disclosure. The operations of method 2900 may be implemented by a base station 105 or its components as described with reference to FIGS. 1-21. For example, the operations of method 2900 may be performed by the base station narrowband communication module 145 as described with reference to FIGS. 1 and 18-21. In some examples, a base station 105 may execute a set of codes to control the functional elements of the base station 105 to perform the functions described below. Additionally or alternatively, the base station 105 may perform aspects of the functions described below using special-purpose hardware. The method 2900 may also incorporate aspects of methods 2200, 2300, 2400, 2500, 2600, 2700, and 2800 of FIGS. 22-28.

At block 2905, the base station 105 may generate a PBCH signal for transmission of system information for device discovery, the PBCH signal included in a resource block to be transmitted in the narrowband region as described with reference to FIGS. 2-13. In certain examples, the operations of block 2905 may be performed by the PBCH module 1920 as described with reference to FIG. 19.

At block 2910, the base station 105 may identify a subframe that includes the resource block as a MBSFN subframe as described with reference to FIGS. 2-13. In certain examples, the operations of block 2910 may be performed by the MBSFN module 2020 as described with reference to FIG. 20.

At block 2915, the base station 105 may transmit the PBCH signal in the MBSFN subframe as described with reference to FIGS. 2-13. In certain examples, the operations of block 2915 may be performed by the PBCH module 1920 as described with reference to FIG. 19.

Thus, methods 2200, 2300, 2400, 2500, 2600, 2700, 2800, and 2900 may provide for downlink and synchronization techniques for narrowband wireless communications. It should be noted that methods 2200, 2300, 2400, 2500, 2600, 2700, 2800, and 2900 describe possible implementation, and that the operations and the steps may be rearranged or otherwise modified such that other implementations are possible. In some examples, aspects from two or more of the methods 2200, 2300, 2400, 2500, 2600, 2700, 2800, and 2900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as the GSM. An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-a are new releases of Universal Mobile Telecommunications System (UMTS) that use E-UTRA. UTRA, E-UTRA, Universal Mobile Telecommunications System (UMTS), LTE, LTE-a, and the GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication in a system that supports operation in a narrowband region of a system bandwidth, comprising:
    identifying a location of the narrowband region of the system bandwidth as a single resource block within a wideband region of the system bandwidth; and
    transmitting an indication of the location of the single resource block within the wideband region of the system bandwidth, wherein the indication comprises a total wideband bandwidth of the system bandwidth and one or more common reference signal (CRS) resource elements (REs) included in the single resource block and is based at least in part on an offset with respect to a center of the wideband region.

2. The method of claim 1, wherein the indication further comprises a resource block index that indicates a location of the single resource block.

3. The method of claim 1, wherein the indication further comprises a resource block offset.

4. The method of claim 1, wherein the indication is transmitted in one or more of a master information block (MIB) or a system information block (SIB).

5. The method of claim 1, further comprising:
    generating a physical broadcast channel (PBCH) signal for transmission of system information for device discovery in the narrowband region;
    modulating the PBCH signal based at least in part on a demodulation reference signal (DMRS); and
    transmitting the modulated PBCH signal in the narrowband region.

6. The method of claim 5, wherein the modulating the PBCH signal comprises:
    selecting a precoding matrix for transmission of the modulated PBCH signal; and
    using the selected precoding matrix for other transmissions in the narrowband region on the system bandwidth.

7. The method of claim 5, further comprising:
    transmitting a common reference signal (CRS) in one or more of the modulated PBCH signal or the other transmissions in the narrowband region of the system bandwidth, the CRS for use in channel estimation.

8. The method of claim 5, wherein the PBCH signal is included in a resource block to be transmitted in the narrowband region, the method further comprising:
    identifying a subframe that includes the resource block as a Multimedia Broadcast Single Frequency Network (MB SFN) subframe; and
    transmitting the PBCH signal in the MB SFN subframe.

9. A method for wireless communication in a system that supports operation in a narrowband region of a system bandwidth, comprising:
    receiving an indication of a location of a single resource block for narrowband transmissions, the single resource block within a wideband region of the system bandwidth, wherein the indication comprises a total wideband bandwidth of the system bandwidth and one or more common reference signal (CRS) resource elements (REs) included in the single resource block and is based at least in part on an offset with respect to a center of the wideband region; and
    identifying one or more synchronization parameters for receiving the narrowband transmissions based at least in part on the indication.

10. The method of claim 9, wherein the identifying the one or more synchronization parameters comprises:
    applying a common reference signal (CRS) sequence based at least in part on a cell identification of a transmitter and a resource block offset value included in the indication.

11. The method of claim 9, wherein the indication further comprises a resource block index that indicates a location of the single resource block.

12. The method of claim 9, further comprising:
    decoding a physical broadcast channel (PBCH) in the narrowband region to obtain a first set of bits;
    descrambling at least part of the first set of bits by a sequence to obtain a second set of bits;
    performing a CRC check on the second set of bits; and
    determining the number of CRS antenna ports and the deployment type based on the CRC check result.

13. A method for wireless communication in a system that supports operation in a narrowband region of a system bandwidth, comprising:
    identifying a frequency band of the narrowband region of the system bandwidth for transmission of a physical broadcast channel (PBCH) that includes system information for device discovery;
    determining, based at least in part on the identified frequency band, whether the narrowband region is within a bandwidth of one or more wideband transmissions based at least in part on a radio access technology associated with the identified frequency band; and selecting a decoding technique from a plurality of decoding techniques for decoding the PBCH, wherein the decoding technique is selected based at least in part on the identified frequency band of the narrowband region.

14. The method of claim 13, wherein the determining whether the narrowband region is within the bandwidth of one or more wideband transmissions comprises:
  determining that the narrowband region is outside of the bandwidth of one or more wideband transmissions in response to the identified frequency band being located in radio spectrum allocated to Global System for Mobile (GSM) communications; and
  determining that the narrowband region is within the bandwidth of one or more wideband transmissions in response to the identified frequency band being located in radio spectrum allocated to Long Term Evolution (LTE) communications.

15. The method of claim 14, wherein selecting the decoding technique for decoding the PBCH comprises:
  selecting a common reference signal (CRS) based decoding technique in response to determining that the narrowband region is outside of the bandwidth of one or more wideband transmissions; and
  selecting a demodulation reference signal (DMRS) based decoding technique in response to determining that the narrowband region is within the bandwidth of one or more wideband transmissions.

16. An apparatus for wireless communication in a system that supports operation in a narrowband region of a system bandwidth, comprising:
  a processor;
  memory in electronic communication with the processor; and
  instructions stored in the memory and operable, when executed by the processor, to cause the apparatus to:
    identify a location of the narrowband region of the system bandwidth as a single resource block within a wideband region of the system bandwidth; and
    transmit an indication of the location of the single resource block within the wideband region of the system bandwidth, wherein the indication comprises a total wideband bandwidth of the system bandwidth and one or more common reference signal (CRS) resource elements (REs) included in the single resource block and is based at least in part on an offset with respect to a center of the wideband region.

17. An apparatus for wireless communication in a system that supports operation in a narrowband region of a system bandwidth, comprising:
  a processor;
  memory in electronic communication with the processor; and
  instructions stored in the memory and operable, when executed by the processor, to cause the apparatus to:
    identify a frequency band of the narrowband region of the system bandwidth for transmission of a physical broadcast channel (PBCH) that includes system information for device discovery;
    determine, based at least in part of the identified frequency band, whether the narrowband region is within a bandwidth of one or more wideband transmissions based at least in part on a radio access technology associated with the identified frequency band; and
    select a decoding technique from a plurality of decoding techniques for decoding the PBCH, wherein the decoding technique is selected based at least in part on the identified frequency band of the narrowband region.

* * * * *